(12) United States Patent
Vagell et al.

(10) Patent No.: US 9,529,785 B2
(45) Date of Patent: Dec. 27, 2016

(54) DETECTING RELATIONSHIPS BETWEEN EDITS AND ACTING ON A SUBSET OF EDITS

(71) Applicant: Google Inc., Mountain View, CA (US)

(72) Inventors: Vance Julius Vagell, Kew Gardens, NY (US); Ian Gunn, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 765 days.

(21) Appl. No.: 13/686,310

(22) Filed: Nov. 27, 2012

(65) Prior Publication Data

US 2014/0149857 A1    May 29, 2014

(51) Int. Cl.
G06F 17/00 (2006.01)
G06F 17/24 (2006.01)

(52) U.S. Cl.
CPC .............. *G06F 17/24* (2013.01); *G06F 17/241* (2013.01)

(58) Field of Classification Search
CPC ....................................................... G06F 17/24
See application file for complete search history.

(56) References Cited

U.S. PATENT DOCUMENTS

| | | |
|---|---|---|
| 4,889,439 A | 12/1989 | Cook et al. |
| 5,111,397 A | 5/1992 | Chirokas et al. |
| 5,142,674 A | 8/1992 | Barker et al. |
| 5,146,552 A | 9/1992 | Cassorla et al. |
| 5,231,577 A | 7/1993 | Koss |
| 5,381,523 A | 1/1995 | Hayashi |
| 5,408,470 A | 4/1995 | Rothrock et al. |
| 5,557,722 A | 9/1996 | DeRose et al. |
| 5,600,775 A | 2/1997 | King et al. |
| 5,675,788 A | 10/1997 | Husick et al. |
| 5,694,609 A | 12/1997 | Murata |
| 5,708,826 A | 1/1998 | Ikeda et al. |
| 5,758,358 A | 5/1998 | Ebbo |
| 5,761,669 A | 6/1998 | Montague et al. |
| 5,793,966 A | 8/1998 | Amstein et al. |
| 5,799,325 A | 8/1998 | Rivette et al. |
| 5,819,304 A | 10/1998 | Nilsen et al. |
| 5,860,073 A | 1/1999 | Ferrel et al. |

(Continued)

FOREIGN PATENT DOCUMENTS

| | | |
|---|---|---|
| KR | 2010-0137323 A | 12/2010 |
| KR | 2012-0010397 A | 2/2012 |

OTHER PUBLICATIONS

International Search Report and Written Opinion dated Feb. 26, 2014 in International Application No. PCT/US2013/071171.

(Continued)

*Primary Examiner* — Andrew McIntosh
(74) *Attorney, Agent, or Firm* — Ropes & Gray LLP

(57) ABSTRACT

Systems and methods are disclosed herein for detecting compounding and conflicting suggested edits in a collaborative document editing environment. A first edit and a second edit to an electronic document are received. A shared position of the first edit and the second edit in the electronic document is identified, and a compounding relationship or a conflicting relationship is determined based at least in part on the identification. The first edit, the second edit, and an indicator of the relationship are displayed to a user of the electronic document.

22 Claims, 22 Drawing Sheets

(56) References Cited

U.S. PATENT DOCUMENTS

| | | |
|---|---|---|
| 5,890,177 A | 3/1999 | Moody et al. |
| 5,895,476 A | 4/1999 | Orr et al. |
| 6,025,836 A | 2/2000 | McBride |
| 6,049,664 A | 4/2000 | Dale et al. |
| 6,061,697 A | 5/2000 | Nakao |
| 6,065,026 A * | 5/2000 | Cornelia et al. ............ 715/202 |
| 6,067,551 A | 5/2000 | Brown et al. |
| 6,073,144 A | 6/2000 | van Hoff |
| 6,169,999 B1 | 1/2001 | Kanno |
| 6,173,317 B1 | 1/2001 | Chaddha et al. |
| 6,212,549 B1 | 4/2001 | Page et al. |
| 6,243,706 B1 | 6/2001 | Moreau et al. |
| 6,327,584 B1 | 12/2001 | Xian et al. |
| 6,341,305 B2 | 1/2002 | Wolfe |
| 6,349,308 B1 | 2/2002 | Whang et al. |
| 6,349,314 B1 | 2/2002 | Patel |
| 6,377,957 B1 | 4/2002 | Jeyaraman |
| 6,377,993 B1 | 4/2002 | Brandt et al. |
| 6,418,441 B1 | 7/2002 | Call |
| 6,438,564 B1 | 8/2002 | Morton et al. |
| 6,501,779 B1 | 12/2002 | McLaughlin et al. |
| 6,532,218 B1 | 3/2003 | Shaffer et al. |
| 6,551,357 B1 | 4/2003 | Madduri |
| 6,584,479 B2 | 6/2003 | Chang et al. |
| 6,662,210 B1 | 12/2003 | Carleton et al. |
| 6,665,835 B1 | 12/2003 | Gutfreund et al. |
| 6,687,878 B1 | 2/2004 | Eintracht et al. |
| 6,691,126 B1 | 2/2004 | Syeda-Mahmood |
| 6,697,569 B1 | 2/2004 | Gomez et al. |
| 6,717,593 B1 | 4/2004 | Jennings |
| 6,728,753 B1 | 4/2004 | Parasnis et al. |
| 6,731,309 B1 | 5/2004 | Unbedacht et al. |
| 6,760,749 B1 | 7/2004 | Dunlap et al. |
| 6,766,333 B1 | 7/2004 | Wu et al. |
| 6,771,291 B1 | 8/2004 | DiStefano, III |
| 6,865,713 B1 | 3/2005 | Bates et al. |
| 6,879,997 B1 | 4/2005 | Ketola et al. |
| 6,904,561 B1 | 6/2005 | Faraday et al. |
| 6,912,726 B1 | 6/2005 | Chen et al. |
| 6,983,416 B1 | 1/2006 | Bae et al. |
| 6,988,241 B1 | 1/2006 | Guttman et al. |
| 7,017,112 B2 | 3/2006 | Collie et al. |
| 7,031,954 B1 | 4/2006 | Kirsch |
| 7,035,910 B1 | 4/2006 | Dutta et al. |
| 7,039,643 B2 | 5/2006 | Sena et al. |
| 7,069,502 B2 | 6/2006 | Numata et al. |
| 7,106,469 B2 | 9/2006 | Simpson et al. |
| 7,143,177 B1 | 11/2006 | Johnson et al. |
| 7,149,957 B2 | 12/2006 | Hull et al. |
| 7,149,973 B2 | 12/2006 | Dias et al. |
| 7,162,693 B2 | 1/2007 | Yamanaka et al. |
| 7,197,510 B2 | 3/2007 | Abe et al. |
| 7,206,773 B2 | 4/2007 | Erol et al. |
| 7,213,199 B2 | 5/2007 | Humenansky et al. |
| 7,233,951 B1 | 6/2007 | Gainer et al. |
| 7,263,497 B1 | 8/2007 | Wiser et al. |
| 7,263,688 B2 | 8/2007 | Pitzel et al. |
| 7,266,568 B1 | 9/2007 | Erol et al. |
| 7,284,199 B2 | 10/2007 | Parasnis et al. |
| 7,287,094 B2 | 10/2007 | Mogul |
| 7,299,404 B2 | 11/2007 | Agarwal et al. |
| 7,305,613 B2 | 12/2007 | Oezgen |
| 7,325,187 B2 | 1/2008 | Yashiro |
| 7,330,875 B1 | 2/2008 | Parasnis et al. |
| 7,350,142 B2 | 3/2008 | Kraft et al. |
| 7,409,633 B2 | 8/2008 | Lerner et al. |
| 7,418,656 B1 | 8/2008 | Petersen |
| 7,424,670 B2 | 9/2008 | Burke et al. |
| 7,432,938 B1 | 10/2008 | Reuter et al. |
| 7,437,421 B2 | 10/2008 | Bhogal et al. |
| 7,478,330 B1 | 1/2009 | Branson et al. |
| 7,487,448 B2 | 2/2009 | Emerson et al. |
| 7,491,399 B2 | 2/2009 | Vakharia |
| 7,506,242 B2 | 3/2009 | Kotler et al. |
| 7,529,778 B1 | 5/2009 | Dewey et al. |
| 7,559,017 B2 | 7/2009 | Datar et al. |
| 7,634,728 B2 | 12/2009 | Kraft |
| 7,656,543 B2 | 2/2010 | Atkins |
| 7,667,862 B2 | 2/2010 | Ziegler et al. |
| 7,680,932 B2 | 3/2010 | Defaix et al. |
| 7,698,379 B2 | 4/2010 | Dutta et al. |
| 7,707,413 B2 | 4/2010 | Lunt et al. |
| 7,711,835 B2 | 5/2010 | Braddy et al. |
| 7,712,016 B2 | 5/2010 | Jones et al. |
| 7,734,914 B1 | 6/2010 | Malasky |
| 7,735,101 B2 | 6/2010 | Lanza et al. |
| 7,739,255 B2 | 6/2010 | Hengel et al. |
| 7,743,331 B1 | 6/2010 | Fleischer et al. |
| 7,761,796 B2 | 7/2010 | Faraday et al. |
| 7,769,810 B1 | 8/2010 | Kaufman |
| 7,774,703 B2 | 8/2010 | Junuzovic et al. |
| 7,779,113 B1 | 8/2010 | Samar |
| 7,779,347 B2 | 8/2010 | Christiansen et al. |
| 7,792,788 B2 | 9/2010 | Melmon et al. |
| 7,818,678 B2 | 10/2010 | Massand |
| 7,818,679 B2 | 10/2010 | Clarke |
| 7,823,058 B2 | 10/2010 | Pea et al. |
| 7,836,148 B2 | 11/2010 | Popp et al. |
| 7,849,401 B2 | 12/2010 | Elza |
| 7,865,816 B2 | 1/2011 | Tanaka |
| 7,890,405 B1 | 2/2011 | Robb |
| 7,890,928 B2 | 2/2011 | Patrudu |
| 7,920,894 B2 | 4/2011 | Wyler |
| 7,937,663 B2 | 5/2011 | Parker et al. |
| 7,941,399 B2 | 5/2011 | Bailor et al. |
| 7,941,419 B2 | 5/2011 | Bhatkar et al. |
| 7,941,444 B2 | 5/2011 | Cragun et al. |
| 7,962,853 B2 | 6/2011 | Bedi et al. |
| 7,966,556 B1 | 6/2011 | Bourdev |
| 7,975,223 B2 | 7/2011 | Plumley et al. |
| 7,982,747 B1 | 7/2011 | Dulaney et al. |
| 7,986,298 B1 | 7/2011 | Dulaney et al. |
| 7,996,380 B2 | 8/2011 | Arrouye et al. |
| 7,996,446 B2 | 8/2011 | Bacon et al. |
| 8,015,496 B1 | 9/2011 | Rogers |
| 8,019,780 B1 | 9/2011 | Pinkerton et al. |
| 8,073,812 B2 | 12/2011 | Curtis |
| 8,086,960 B1 | 12/2011 | Gopalakrishna et al. |
| 8,108,427 B2 | 1/2012 | Prahlad et al. |
| 8,116,569 B2 | 2/2012 | Markiewicz et al. |
| 8,131,723 B2 | 3/2012 | Sim-Tang |
| 8,151,204 B2 | 4/2012 | Lusen et al. |
| 8,184,811 B1 | 5/2012 | Patten et al. |
| 8,190,987 B2 | 5/2012 | Campbell et al. |
| 8,225,274 B2 | 7/2012 | Cowtan |
| 8,250,455 B2 | 8/2012 | Kadowaki et al. |
| 8,266,534 B2 | 9/2012 | Curtis et al. |
| 8,275,974 B2 | 9/2012 | Voshell |
| 8,281,023 B2 | 10/2012 | Dondeti et al. |
| 8,296,647 B1 | 10/2012 | Bourdev |
| 8,327,127 B2 | 12/2012 | Suryanarayana et al. |
| 8,332,815 B2 | 12/2012 | Balfe et al. |
| 8,341,708 B1 | 12/2012 | Eatough et al. |
| 8,352,870 B2 | 1/2013 | Bailor et al. |
| 8,364,759 B2 | 1/2013 | Moromisato et al. |
| 8,386,478 B2 | 2/2013 | Wang |
| 8,417,666 B2 | 4/2013 | Bailor et al. |
| 8,418,051 B1 | 4/2013 | Bourdev |
| 8,453,052 B1 | 5/2013 | Newman et al. |
| 8,478,817 B2 | 7/2013 | Duggal |
| 8,682,989 B2 | 3/2014 | Meisels et al. |
| 8,700,986 B1 | 4/2014 | Pereira et al. |
| 8,943,399 B1 | 1/2015 | Pereira et al. |
| 2001/0037346 A1 | 11/2001 | Johnson |
| 2002/0032701 A1 | 3/2002 | Gao et al. |
| 2002/0035580 A1 | 3/2002 | Tanabe |
| 2002/0051185 A1 | 5/2002 | Yamaguchi et al. |
| 2002/0065848 A1 | 5/2002 | Walker et al. |
| 2002/0133492 A1 | 9/2002 | Goldstein et al. |
| 2002/0143691 A1 | 10/2002 | Ramaley et al. |
| 2002/0161797 A1 | 10/2002 | Gallo et al. |
| 2002/0162118 A1 | 10/2002 | Levy et al. |
| 2002/0174085 A1 | 11/2002 | Nelson et al. |
| 2002/0174224 A1 | 11/2002 | Scheifler et al. |

(56) References Cited

U.S. PATENT DOCUMENTS

| | | |
|---|---|---|
| 2002/0194302 A1 | 12/2002 | Blumberg |
| 2003/0014406 A1 | 1/2003 | Faieta et al. |
| 2003/0037076 A1 | 2/2003 | Bravery et al. |
| 2003/0037303 A1 | 2/2003 | Bodlaender et al. |
| 2003/0061280 A1 | 3/2003 | Bulson et al. |
| 2003/0084078 A1 | 5/2003 | Torii et al. |
| 2003/0105719 A1 | 6/2003 | Berger et al. |
| 2003/0126592 A1 | 7/2003 | Mishra et al. |
| 2003/0145279 A1 | 7/2003 | Bourbakis et al. |
| 2003/0222890 A1 | 12/2003 | Salesin et al. |
| 2004/0019595 A1 | 1/2004 | Bhogal et al. |
| 2004/0044965 A1 | 3/2004 | Toyama et al. |
| 2004/0085354 A1 | 5/2004 | Massand |
| 2004/0088653 A1 | 5/2004 | Bell et al. |
| 2004/0103141 A1 | 5/2004 | Miller et al. |
| 2004/0133444 A1 | 7/2004 | Defaix et al. |
| 2004/0133639 A1 | 7/2004 | Shuang et al. |
| 2004/0201633 A1 | 10/2004 | Barsness et al. |
| 2004/0205358 A1 | 10/2004 | Erickson |
| 2004/0205477 A1 | 10/2004 | Lin |
| 2004/0210833 A1 | 10/2004 | Lerner et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2004/0248612 A1 | 12/2004 | Lee et al. |
| 2004/0255005 A1 | 12/2004 | Spooner |
| 2004/0255337 A1 | 12/2004 | Doyle et al. |
| 2004/0260594 A1 | 12/2004 | Maddox |
| 2004/0260714 A1 | 12/2004 | Chatterjee et al. |
| 2005/0055337 A1 | 3/2005 | Bebo et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0144256 A1 | 6/2005 | Blumberg |
| 2005/0160355 A1 | 7/2005 | Cragun et al. |
| 2005/0160356 A1 | 7/2005 | Albornoz et al. |
| 2005/0160357 A1 | 7/2005 | Rivette et al. |
| 2005/0160368 A1 | 7/2005 | Liu et al. |
| 2005/0182650 A1 | 8/2005 | Maddox et al. |
| 2005/0185636 A1 | 8/2005 | Bucher |
| 2005/0200896 A1 | 9/2005 | Narusawa et al. |
| 2005/0223315 A1 | 10/2005 | Shimizu et al. |
| 2005/0234943 A1 | 10/2005 | Clarke |
| 2005/0243760 A1 | 11/2005 | Yoshioka |
| 2005/0268220 A1 | 12/2005 | Tanaka |
| 2005/0273695 A1 | 12/2005 | Schnurr |
| 2005/0289538 A1 | 12/2005 | Black-Ziegelbein et al. |
| 2006/0005168 A1 | 1/2006 | Singh |
| 2006/0031751 A1 | 2/2006 | Ehud |
| 2006/0053194 A1 | 3/2006 | Schneider et al. |
| 2006/0053365 A1 | 3/2006 | Hollander et al. |
| 2006/0070029 A1 | 3/2006 | Laborczfalvi et al. |
| 2006/0075332 A1 | 4/2006 | Fairweather et al. |
| 2006/0080601 A1 | 4/2006 | Weber et al. |
| 2006/0101071 A1 | 5/2006 | Henderson |
| 2006/0101328 A1 | 5/2006 | Albornoz et al. |
| 2006/0123329 A1 | 6/2006 | Steen et al. |
| 2006/0123348 A1 | 6/2006 | Ross et al. |
| 2006/0149795 A1 | 7/2006 | Gillespie et al. |
| 2006/0149831 A1 | 7/2006 | Dutta et al. |
| 2006/0161841 A1 | 7/2006 | Horiuchi et al. |
| 2006/0200755 A1 | 9/2006 | Melmon et al. |
| 2006/0224570 A1 | 10/2006 | Quiroga et al. |
| 2006/0230344 A1 | 10/2006 | Jennings et al. |
| 2006/0248121 A1 | 11/2006 | Cacenco et al. |
| 2006/0282762 A1 | 12/2006 | Diamond et al. |
| 2006/0282778 A1 | 12/2006 | Barsness et al. |
| 2007/0003223 A1 | 1/2007 | Armstrong et al. |
| 2007/0033654 A1 | 2/2007 | Wilson |
| 2007/0047008 A1 | 3/2007 | Graham et al. |
| 2007/0055926 A1 | 3/2007 | Christiansen et al. |
| 2007/0061714 A1 | 3/2007 | Stuple et al. |
| 2007/0067182 A1 | 3/2007 | Harp et al. |
| 2007/0070066 A1 | 3/2007 | Bakhash |
| 2007/0073899 A1 | 3/2007 | Judge et al. |
| 2007/0100938 A1 | 5/2007 | Bagley et al. |
| 2007/0118598 A1 | 5/2007 | Bedi et al. |
| 2007/0118794 A1 | 5/2007 | Hollander et al. |
| 2007/0118795 A1 | 5/2007 | Noyes et al. |
| 2007/0174762 A1 | 7/2007 | Plant |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0239695 A1 | 10/2007 | Chakra et al. |
| 2007/0244906 A1 | 10/2007 | Colton et al. |
| 2007/0250901 A1 | 10/2007 | McIntire et al. |
| 2007/0254631 A1 | 11/2007 | Spooner |
| 2007/0260677 A1 | 11/2007 | DeMarco et al. |
| 2007/0260996 A1 | 11/2007 | Jakobson |
| 2007/0266325 A1 | 11/2007 | Helm et al. |
| 2007/0271502 A1 | 11/2007 | Bedi et al. |
| 2007/0288637 A1 | 12/2007 | Layton et al. |
| 2008/0028302 A1 | 1/2008 | Meschkat |
| 2008/0034275 A1 | 2/2008 | Edd et al. |
| 2008/0040659 A1 | 2/2008 | Doyle |
| 2008/0046837 A1 | 2/2008 | Beauchamp et al. |
| 2008/0059417 A1 | 3/2008 | Yamada et al. |
| 2008/0059539 A1 | 3/2008 | Chin et al. |
| 2008/0071827 A1 | 3/2008 | Hengel et al. |
| 2008/0082604 A1 | 4/2008 | Mansour et al. |
| 2008/0092066 A1 | 4/2008 | Edlund et al. |
| 2008/0126943 A1 | 5/2008 | Parasnis et al. |
| 2008/0127212 A1 | 5/2008 | Nakamizo et al. |
| 2008/0168073 A1 | 7/2008 | Siegel et al. |
| 2008/0172720 A1 | 7/2008 | Botz et al. |
| 2008/0189361 A1 | 8/2008 | Greschler et al. |
| 2008/0222273 A1 | 9/2008 | Lakshmanan et al. |
| 2008/0229181 A1 | 9/2008 | Jung et al. |
| 2008/0244374 A1 | 10/2008 | Hattori |
| 2008/0263101 A1 | 10/2008 | Hara |
| 2008/0263442 A1 | 10/2008 | Plumley et al. |
| 2008/0270406 A1 | 10/2008 | Flavin et al. |
| 2008/0282143 A1 | 11/2008 | Hiyama et al. |
| 2008/0301571 A1 | 12/2008 | Herzog |
| 2009/0006842 A1 | 1/2009 | Ross et al. |
| 2009/0025063 A1 | 1/2009 | Thomas |
| 2009/0049046 A1 | 2/2009 | Godzik et al. |
| 2009/0055755 A1 | 2/2009 | Hicks et al. |
| 2009/0070128 A1 | 3/2009 | McCauley et al. |
| 2009/0083707 A1 | 3/2009 | Fujita et al. |
| 2009/0089664 A1 | 4/2009 | Wagner et al. |
| 2009/0094086 A1 | 4/2009 | Bruno et al. |
| 2009/0094329 A1 | 4/2009 | Ambati et al. |
| 2009/0099919 A1 | 4/2009 | Schultheiss et al. |
| 2009/0112953 A1 | 4/2009 | Barsness et al. |
| 2009/0112990 A1 | 4/2009 | Campbell et al. |
| 2009/0119572 A1 | 5/2009 | Koivunen |
| 2009/0129596 A1 | 5/2009 | Chavez et al. |
| 2009/0132907 A1 | 5/2009 | Shao et al. |
| 2009/0144616 A1 | 6/2009 | Mori |
| 2009/0157608 A1* | 6/2009 | Strathearn ......... G06F 17/30719 |
| 2009/0157811 A1 | 6/2009 | Bailor et al. |
| 2009/0164620 A1 | 6/2009 | Ziegler et al. |
| 2009/0165128 A1 | 6/2009 | McNally et al. |
| 2009/0192845 A1 | 7/2009 | Gudipaty et al. |
| 2009/0210459 A1 | 8/2009 | Nair et al. |
| 2009/0210721 A1 | 8/2009 | Phillips |
| 2009/0235181 A1 | 9/2009 | Saliba et al. |
| 2009/0235352 A1 | 9/2009 | Schrijen et al. |
| 2009/0249224 A1 | 10/2009 | Davis et al. |
| 2009/0254580 A1 | 10/2009 | Laurion |
| 2009/0254802 A1 | 10/2009 | Campagna et al. |
| 2009/0254840 A1 | 10/2009 | Churchill et al. |
| 2009/0271696 A1* | 10/2009 | Bailor et al. .................. 715/229 |
| 2009/0288135 A1 | 11/2009 | Chang et al. |
| 2009/0292548 A1 | 11/2009 | Van Court |
| 2009/0307585 A1 | 12/2009 | Tranchant et al. |
| 2010/0005398 A1 | 1/2010 | Pratley et al. |
| 2010/0005410 A1 | 1/2010 | Pang |
| 2010/0005529 A1 | 1/2010 | Hemade |
| 2010/0030578 A1 | 2/2010 | Siddique et al. |
| 2010/0031135 A1 | 2/2010 | Naghshin et al. |
| 2010/0050089 A1 | 2/2010 | Kim et al. |

(56) References Cited

U.S. PATENT DOCUMENTS

| | | |
|---|---|---|
| 2010/0070852 A1 | 3/2010 | Li |
| 2010/0077301 A1 | 3/2010 | Bodnick et al. |
| 2010/0083096 A1 | 4/2010 | Dupuis-Latour et al. |
| 2010/0161762 A1 | 6/2010 | Saxena |
| 2010/0174783 A1* | 7/2010 | Zarom ........................ 709/205 |
| 2010/0199191 A1 | 8/2010 | Takahashi |
| 2010/0205230 A1 | 8/2010 | Simeonov et al. |
| 2010/0205520 A1 | 8/2010 | Parish et al. |
| 2010/0218099 A1 | 8/2010 | van Melle et al. |
| 2010/0229086 A1 | 9/2010 | Howell et al. |
| 2010/0235763 A1 | 9/2010 | Massand |
| 2010/0245256 A1 | 9/2010 | Estrada et al. |
| 2010/0251092 A1 | 9/2010 | Sun |
| 2010/0251122 A1 | 9/2010 | Lee et al. |
| 2010/0257457 A1 | 10/2010 | De Goes |
| 2010/0257578 A1 | 10/2010 | Shukla et al. |
| 2010/0262636 A1 | 10/2010 | Bacon et al. |
| 2010/0262659 A1 | 10/2010 | Christiansen et al. |
| 2010/0274910 A1 | 10/2010 | Ghanaie-Sichanie et al. |
| 2010/0278453 A1 | 11/2010 | King |
| 2010/0281076 A1 | 11/2010 | Pan et al. |
| 2010/0281528 A1 | 11/2010 | Hayton et al. |
| 2010/0309436 A1 | 12/2010 | Allen, Jr. et al. |
| 2010/0318894 A1 | 12/2010 | Billharz et al. |
| 2011/0018963 A1 | 1/2011 | Robinson |
| 2011/0035661 A1 | 2/2011 | Balinsky et al. |
| 2011/0055702 A1 | 3/2011 | Jakobson |
| 2011/0060844 A1 | 3/2011 | Allan et al. |
| 2011/0066668 A1 | 3/2011 | Guarraci |
| 2011/0066957 A1 | 3/2011 | Prats et al. |
| 2011/0078246 A1 | 3/2011 | Dittmer-Roche |
| 2011/0085211 A1 | 4/2011 | King et al. |
| 2011/0099093 A1 | 4/2011 | Mills |
| 2011/0137979 A1 | 6/2011 | Seo et al. |
| 2011/0154185 A1 | 6/2011 | Kern et al. |
| 2011/0161413 A1 | 6/2011 | Cierniak et al. |
| 2011/0164043 A1 | 7/2011 | Arora et al. |
| 2011/0179427 A1 | 7/2011 | Krishnamoorthy et al. |
| 2011/0184784 A1 | 7/2011 | Rudow et al. |
| 2011/0202672 A1 | 8/2011 | Narayanaswamy et al. |
| 2011/0209052 A1 | 8/2011 | Parker et al. |
| 2011/0219331 A1 | 9/2011 | DeLuca et al. |
| 2011/0231912 A1 | 9/2011 | Lee et al. |
| 2011/0238663 A1 | 9/2011 | Zhang |
| 2011/0252038 A1 | 10/2011 | Schmidt et al. |
| 2011/0252299 A1 | 10/2011 | Lloyd et al. |
| 2011/0252335 A1 | 10/2011 | Lloyd et al. |
| 2011/0252339 A1 | 10/2011 | Lemonik et al. |
| 2011/0264712 A1 | 10/2011 | Ylonen |
| 2011/0282933 A1 | 11/2011 | Schmier |
| 2011/0295593 A1 | 12/2011 | Raghuveer |
| 2011/0296299 A1 | 12/2011 | Parker |
| 2012/0005159 A1 | 1/2012 | Wang et al. |
| 2012/0023407 A1 | 1/2012 | Taylor |
| 2012/0036423 A1 | 2/2012 | Haynes, II et al. |
| 2012/0047434 A1 | 2/2012 | Ginetti |
| 2012/0072821 A1 | 3/2012 | Bowling |
| 2012/0095878 A1 | 4/2012 | Feldman et al. |
| 2012/0099135 A1 | 4/2012 | Ono |
| 2012/0110445 A1 | 5/2012 | Greenspan et al. |
| 2012/0110646 A1 | 5/2012 | Ajitomi et al. |
| 2012/0117406 A1 | 5/2012 | Eun |
| 2012/0117452 A1 | 5/2012 | Lloyd et al. |
| 2012/0131483 A1 | 5/2012 | Archer et al. |
| 2012/0144202 A1 | 6/2012 | Counterman |
| 2012/0144454 A1 | 6/2012 | Lee |
| 2012/0185759 A1 | 7/2012 | Balinsky |
| 2012/0210210 A1 | 8/2012 | Itoh et al. |
| 2012/0233543 A1 | 9/2012 | Vagell et al. |
| 2012/0240027 A1 | 9/2012 | Pereira et al. |
| 2012/0254042 A1 | 10/2012 | Ludemann |
| 2012/0266229 A1 | 10/2012 | Simone et al. |
| 2012/0278401 A1 | 11/2012 | Meisels et al. |
| 2013/0036455 A1 | 2/2013 | Bodi et al. |
| 2013/0047072 A1 | 2/2013 | Bailor |
| 2013/0086670 A1 | 4/2013 | Vangpat et al. |
| 2013/0097490 A1 | 4/2013 | Kotler et al. |
| 2013/0103387 A1 | 4/2013 | Kinder |
| 2013/0111336 A1 | 5/2013 | Dorman et al. |
| 2013/0124606 A1 | 5/2013 | Carpenter et al. |
| 2013/0155071 A1 | 6/2013 | Chan et al. |
| 2013/0262373 A1 | 10/2013 | Rampson |
| 2013/0326330 A1 | 12/2013 | Harris et al. |
| 2014/0082470 A1 | 3/2014 | Trebas et al. |
| 2014/0164255 A1 | 6/2014 | Daly et al. |
| 2014/0165087 A1 | 6/2014 | Smith et al. |

OTHER PUBLICATIONS

Beresford et al., MockDroid: Trading Privacy for Application Functionality on Smartphones, HotMobile '11 Mar. 1-3, 2011, Phoenix, AZ, USA.

Bibi et al., A Platform for Delivering Multimedia Presentations on Cultural Heritage, 2010 14th Panhellenic Conference on Informatics, pp. 175-179.

Brouwer et al., MathDox editor, Electronic Proceedings MathUI 2009, 2009, XP55028009, retrieved from the Internet May 23, 2012: <http:/Www/>win.tue.nl/hansc/mde.pdf.

Cayenne-McCall, Synchronous 3D Document Collaboration, Pace University, Department of Computer Sciene; Nov. 2008. (42 Pages).

Chevalier et al., Using Text Animated Transitions to Support Navigation in Document Histories, Proceedings of the 28th International Conference in Human Factors in Computing Systems, Apr. 10, 2010, 683-692.

Chitu,Footnotes in GoogleDocs, Oct. 17, 2008, XP055028085, retrieved from the Internet May 24, 2012: http://googlesystem.blogspot.com/2008/10/footnotes-in-google-docs.html.

Dan R. Herrick, Google This! Using Google Apps for Collaboration and Productivity, Proceedings of the ACM SIGUCCS Fall Conference on User Services Conference, SIGUCCS '09, Jan. 1, 2009, 55.

Danilatos, Riche Text Editor—Message dated Jun. 10, 2010 8:57am, Wave Protocol Group Discussion Forum, Jun. 10, 2010, XP055027976, retrieved from the Internet May 23, 2012: https://groups.google.com/group/wave-protocol/browse_thread/thread173608bf7a13f2385.

Danilatos. Demonstration Doodad, with a few different variations of rendering and interactive behaviour,Dec. 5, 2010.

De Lara et al., Puppeteer: Component-Based Adaptation for Mobile Computing, Proceedings of the 3rd USEIX Symposium on Internet Techonologies and Systems, 14 pages (Mar. 27, 2001).

Ellis et al., Concurrency Control in Groupware Systems, ACM 1989, pp. 399-407.

Ellis et al., Groupware Some Issues and Experiences, Communications of the Association for Computing Machinery, ACM, 34:1, Jan. 1, 1991,38-58.

File; Microsoft Computer Dictionary; May 1, 2002; Microsoft Press; Fifth Edition; p. 266.

Frazer, Differential Synchronization, Google, Munich, Germany (2009) 8 pages.

Google Docs 4 Everyone http://www.scribd.com/doc/14119795/Google-Docs-4-Everyone Published Feb. 2009 Steven Holzner.

Googlepedia: The Ultimate Google Resource, Third Edition pp. 1-24 (pp. 276-287 in original source).

Gutwin et al., Improving Network Efficiency in Real-Time Groupware with General Message Compression, University of Saskatchewan, Canada, University of Canterbury, 10 pages, New Zealand (2006).

Hashemi, ambigity Resolution by Reording Rules in Text Containing Errors, Association for Computational Linguistics, 62(1):69-70 (2007).

Hearnden, Wave Editor & Document Renders. A talk by Dave Hearnden at teh Wave Summit captured in video on YouTube Nov. 12, 2010, retrieved from the Internet 5123/2012: http:J/youtu.beiEuXApEullzc.

Hill et al., The MAUI Toolkit: Groupware Widgets for Group Awareness, p. 539-571 in Computer Supported Cooperative Word (2004) 13, (copyright 2005) (MAUI).

(56) References Cited

OTHER PUBLICATIONS

Hodel et al., Supporting Collaborative Layouting in Word Processing, University of Zurich, Department of Inforamtics; Zurich, Switzerland, 2004 (18 page).
http://web.archive.org/web/20120512130530/https://developer.mozilla.org/en/Setting_up_extension_development_environment Aug. 19, 2012.
http://web.archive.org/web/20120819143535/https://addons.mozilla.org/en-US/firefox/extensions/?sort=featured.
http://web.archive.org/web/20121020134710/https://addons.mozilla.org/en-US/seamonkey/extensions Dec. 13, 2013.
http://web.archive.org/web/20121021135356/http://support.mozilla.org/en-US/kb/find-and-install-add-ons-add-features-to-firefox Dec. 13, 2013.
http://www-archive.mozilla.org/projects/webservice retrieved from the Internet Dec. 13, 2013.
https://addons.mozilla.org/En-us/seamonkey/addon/gmail-smime/?src=search Dec. 13, 2013.
Huang et al., A General Purpose Virtual Collaboration Room, Google 1999, pp. 1-9.
Ignat et al., Awareness of Concurrent Changes in Distributed Software Development, Nancy-Universite, France 2008 (9 pages).
Ignat et al., CoDoc: Multi-mode Collaboration over Documents, CAiSE, Jan. 1, 2004, pp. 580-594; Retrieved from the Internet: URL:http://www.springerlink.com/content/mffh585tc0ntcype/fulltext.pdf [retrieved on Jun. 17, 2011].
International Search Report and Written Opinion dated Feb. 25, 2014 in International Application No. PCT/US2013/043011.
International Search Report and Written Opinion dated Mar. 5, 2015 in International Application No. PCT/US2014/058275.
International Search Report and Written Opinion for PCT/US2012/028069 issued Jun. 1, 2012, 1-7.
International Search Report and Written Opinion for PCT/US2014/048408 issued Mar. 12, 2014.
International Search Report and Written Opinion issued in PCT|US2012/028279 on Jun. 6, 2012.
John Day-Richter, Internet Archive Copy of Online Article; What's Different About the New Google Docs: Making Collaboration Fast, Sep. 9, 2010, 1-6, http:f/web.archive.org/web/20100927180700/http:J/googledocs.blospot. com/2010/09/whats-different-about-new-google-docs_23.html, retrieved Feb. 14, 2012.
Junuzovic et al., Read, Write and Navigation Awareness in Realistic Multi-View Collaborations, International Conference on Collaborative Computing: Networking, Applications and Worksharing, 2007, 494-503.
Kindberg, Mushroom: A Framework for Collaboration and Interaction across the Internet, Google 1996, pp. 1-11.
Krieger, Documents, Presentations, and Workbooks: Using Microsoft® Office to Create Content That Gets Noticed, published May 2011, pp. 1-104.
Masoodian, M., et al., RECOLED: A Group-Aware Collaborative Text Editor for Capturing Document History, In Proceedings of IADIS International Conference on WWW/Internet, Lisbon, Portugal, Oct. 19-22, 2005, International Association for Development of the Information Society, vol. 1, 323-330.
Muhammad et al., Awareness Elements in Web Based Cooperative Writing Applications, Second Asia-Pacific Conference on Computationa Intelligence and Industrial Applications, 18 pages (2009).
Mulvany, What's Going on in Indexing, ACM 1997, pp. 10-15.
Munteaunu et al., Collaborative Editing for Improved Usefulness and Usability of Transcript-Enhanced Webcasts, ACM 2008, pp. 373-382.
Nasir et al., Collaborative Report Creation System for Industrial Use, Yamagata University, Graduate School of Science and Engineering; Yamagata, Japan 2009 (6 pages).
Nauman et al., Apex: Extending Android Permission Model and Enforcement with User-Defined Runtime Constraints, ASIACCS '10 Apr. 13-16, 2010 Beijing, China.
Nichols et al., High-Latency, Low-Bandwidth Windowing in the Jupiter Collaboration System, UIST '95. 8th Annual Symposium on User Interface Software and Technology. Proceedings of the ACM Symposium on User Interface SoftwareandTedmology,Nov. 14-17, 1995,111-120.
Pacull et al., Duplex: A Distributed Collaborative Editing Environment in Large Scale, ACM 1994, pp. 165-173.
Peels et al., Document Architecture and Text Formatting, ACM Transactions on Office Information Systems, XX, XX, 310/1/1985,347-369.
Raggett, Dave, Slidy—a web based alternative to Microsoft PowerPoint, published 2006, pp. 1-13.
Raman, Cloud Computing and Equal Access for All, Google Inc. 2008 (4 pages).
Shen et al., Flexible Merging for Asynchronouse Collaborative Systems, Griffith University, School of Computing an Information Technology, Brisbane, Australia 2002 (18 pages).
Shen et al., Integrating Advanced Collaborative Capabilitites into Web-Based Word Processors, Nauyang Technological University, School of Computer Engineering, Singapore 2007 (8 pages).
Simultaneously edit a presentation with other authors, by MicrosoftTM Office: MAC, published Nov. 11, 2010, pp. 1-4.
Taylor, Cool Apple Keynote Presentation Tricks and Tips, published Apr. 2011, p. 1-5.
The Oauth 2.0 Authorization Protocol; draft letf-oauth-v2-24; Mar. 8, 2012.
Using Adobe Buzzword, 2008, pp. 1-35 (undated).
Using Adobe Flash Professional CS5 & CS5.5, Jan. 16, 2012, Adobe Systems Incorporated, pp. 125-126, http://help.adobe.com/en_US/flash/cs/using/flash_cs5_help.pdf.
Wang et al. Google Wave Operational Transformation, Jul. 1, 2010, 1-6, retrieved from the Internet Feb. 14, 2012: http:/1 wave-protocol.googlecode.comfhg/Whitepapers/operational-transform/operational-transform.html.
Wave-Protocol, retrieved from the Internet May 24, 2012: http://code.google.com/p/wave-protocol/source/browse/srcJorg/waveprotocol/wave/client/editor/exampleslimg/MyDoodad.java.
Wempen, Faithe, PowerPoint 2010 Bible, May 24 ,2010, John Wiley & Sons, pp. 491-519.
Zafer NetEdit: A Collaborative Editor, Blacksburt, Virginia 89 pages (Apr. 23, 2011).
Zhou et al., Taming Information-Stealing Smartphone Applications (on Android), LNCS 6740:93-107 (2011).

* cited by examiner

| USER ID | USER TYPE |
|---------|-----------|
| USER A | REVIEWER |
| USER B | REVIEWER |
| USER C | REVIEWER |
| USER D | EDITOR |

SUGGESTION MODE. YOUR EDITS WILL BECOME SUGGESTIONS.

1254    DISPLAY OF MARKUP VERSION OF DOCUMENT

During development of a document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

Accordingly, methods are disclosed herein for detecting compounding and conflicting suggested edits in a collaborative document editing environment. One aspect relates to a method for identifying REVIEWER A
ADDITION: 10:00 AM, TODAY
"During development of a document,"     224

SUGGESTION MODE. YOUR EDITS WILL BECOME SUGGESTIONS.

| 1254 | DISPLAY OF MARKUP VERSION OF DOCUMENT |

1345

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

Accordingly, methods are disclosed herein for detecting compounding and conflicting suggested edits in a collaborative document editing environment. One aspect relates to a method for identifying

224

REVIEWER A
ADDITION: 10:00 AM, TODAY
"During development of a document,"

REVIEWER B
ADDITION: 11:42 AM, TODAY
"n electronic"

EDITOR MODE

DISPLAY OF MARKUP VERSION OF DOCUMENT

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

Accordingly, methods are disclosed herein for detecting compounding and conflicting suggested edits in a collaborative document editing environment. One aspect relates to a method for identifying

— 1345

REVIEWER B
ADDITION: 11:42 AM, TODAY
"n electronic"

ACCEPT ☐
REJECT ☐
— 332

— 228

EDITOR DISPLAY OPTIONS — 334

SUGGESTION MODE. YOUR EDITS WILL BECOME SUGGESTIONS.

DISPLAY OF MARKUP VERSION OF DOCUMENT

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. ~~Since each reviewer may create a unique version of the electronic document, there may be conflicts across versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.~~

Accordingly, methods are disclosed herein for detecting compounding and conflicting suggested edits in a collaborative document editing environment. One aspect relates to a method for identifying REVIEWER C    SHOW ☑
DELETION: 9:42 AM, TODAY
"Since each reviewer may create a uni..."

440

SUGGESTION MODE. YOUR EDITS WILL BECOME SUGGESTIONS.

DISPLAY OF MARKUP VERSION OF DOCUMENT

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

Accordingly, methods are disclosed herein for detecting compounding and conflicting suggested edits in a collaborative document editing environment. One aspect relates to a method for identifying REVIEWER C   SHOW ☐
DELETION: 9:42 AM, TODAY
"Since each reviewer may create a uni..."

SUGGESTION MODE. YOUR EDITS WILL BECOME SUGGESTIONS.

DISPLAY OF MARKUP VERSION OF DOCUMENT

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

Accordingly, methods are disclosed herein for detecting compounding and conflicting suggested edits in a collaborative document editing environment. One aspect relates to a method for identifying

!! CONFLICTING SUGGESTIONS !!

REVIEWER C    SHOW ☐
DELETION: 9:42 AM, TODAY
"Since each reviewer may create a uni...."

REVIEWER B    SHOW ☑
ADDITION: 2:44 PM, TODAY
"different "

EDITOR MODE

DISPLAY OF MARKUP VERSION OF DOCUMENT

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

Accordingly, methods are disclosed herein for detecting compounding and conflicting suggested edits in a collaborative document editing environment. One aspect relates to a method for identifying

!! CONFLICTING SUGGESTIONS !!

ACCEPT ☐
REJECT ☐

REVIEWER C    SHOW ☐
DELETION: 9:42 AM, TODAY
"Since each reviewer may create a uni…"

REVIEWER B    SHOW ☑
ADDITION: 2:44 PM, TODAY
"different"

ACCEPT ☐
REJECT ☐

EDITOR DISPLAY OPTIONS

FIG. 14

DETECTING RELATIONSHIPS BETWEEN EDITS AND ACTING ON A SUBSET OF EDITS

FIELD OF THE INVENTION

In general, this disclosure relates to electronic documents, in particular, to systems and methods for detecting relationships between edits and acting on a subset of edits.

BACKGROUND

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

SUMMARY

Accordingly, methods are disclosed herein for detecting compounding and conflicting suggested edits in a collaborative document editing environment. One aspect relates to a method for identifying compounding relationships between edits in an electronic document. A processor receives a first edit and a second edit to the electronic document and identifies a shared position of the first edit and the second edit in the electronic document. The processor determines that the first edit and the second edit have a compounding relationship based at least in part on the identification.

Another aspect relates to a method for identifying conflicting relationships between edits in an electronic document. A processor receives a first edit and a second edit to the electronic document and identifies a shared position of the first edit and the second edit in the electronic document. The processor determines that the first edit and the second edit have a conflicting relationship based at least in part on the identification and displays the first edit, the second edit, and an indicator of the conflict to a user of the electronic document.

Another aspect relates to a system for identifying compounding relationships between suggested edits in an electronic document. A receiver processor receives first and second suggested edits to the electronic document. In addition, a compound identifier coupled to the receiver processor identifies a shared position of the suggested edits in the electronic document and determines the first and second suggested edits have a compounding relationship based at least in part on the identification.

Another aspect relates to a system for identifying conflicting relationships between suggested edits in an electronic document. A receiver processor receives first and second suggested edits to the electronic document. In addition, a conflict identifier coupled to the receiver processor identifies a shared position of the suggested edits in the electronic document and determines the first and second suggested edits have a conflicting relationship based at least in part on the identification. A user interface displays the first and second suggested edits and an indicator of the conflict to a user of the electronic document.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure stored on an electronic database that includes a document access control list, according to an illustrative embodiment.

FIGS. 5-6 are diagrams of exemplary displays of a reviewer interface for interacting with a document with compounding suggested edits, according to an illustrative embodiment.

FIGS. 7-10 are diagrams of exemplary displays of an editor interface for interacting with a document with compounding suggested edits, according to an illustrative embodiment.

FIGS. 11-13 are diagrams of exemplary displays of a reviewer interface for interacting with a document with conflicting suggested edits, according to an illustrative embodiment.

FIGS. 14-16 are diagrams of exemplary displays of an editor interface for interacting with a document with conflicting suggested edits, according to an illustrative embodiment.

DETAILED DESCRIPTION

To provide an overall understanding of the disclosure, certain illustrative embodiments will now be described, including a system for detecting relationships between edits and acting on a subset of edits. In particular, detecting relationships between edits and acting on a subset of edits allows for efficient development of a document. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
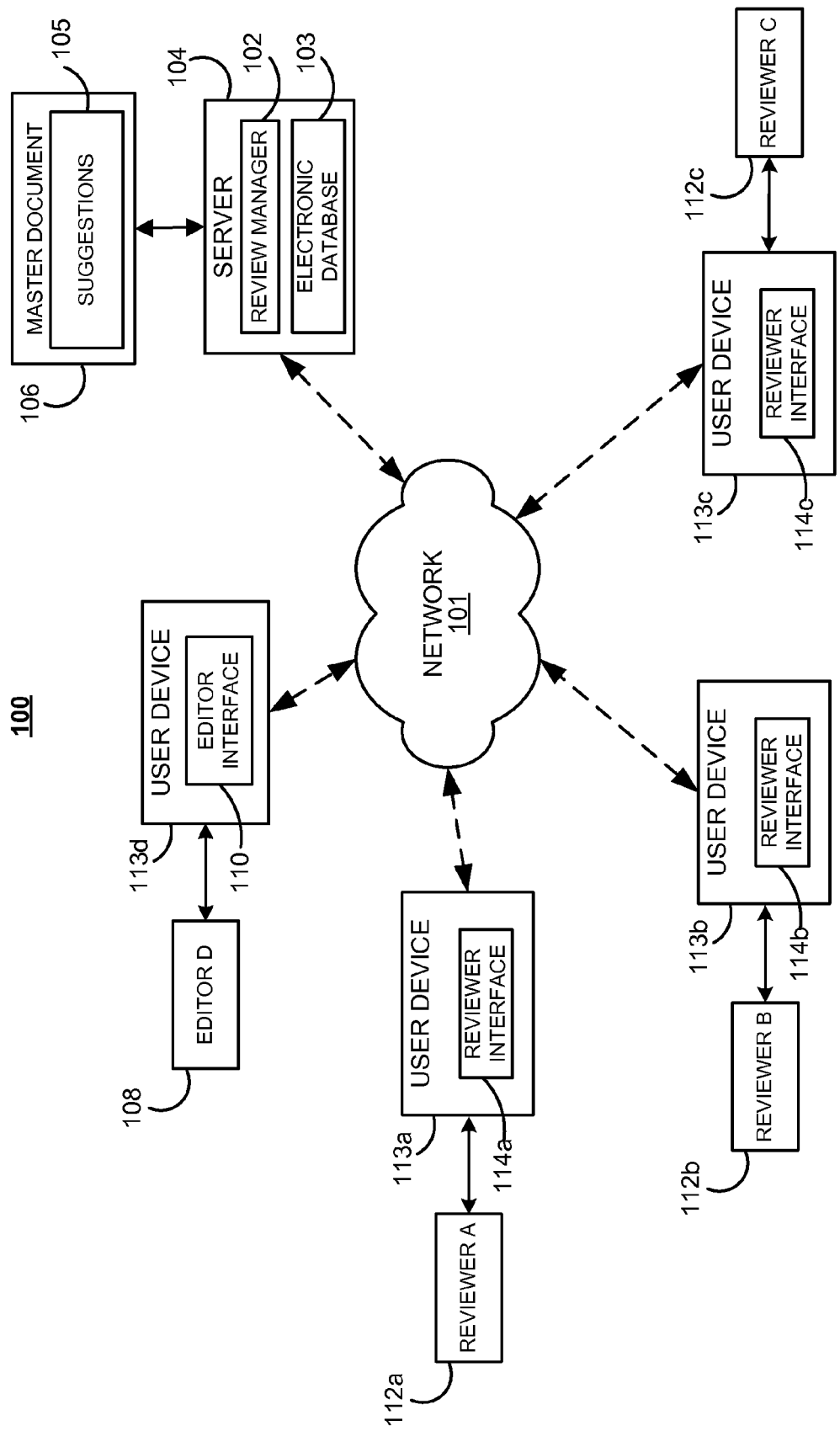
FIG. 1 is a block diagram of a computerized system for integrating collaboratively proposed changes and publishing an electronic document, according to an illustrative embodiment.
Figure 3:
FIG. 3 is an example data structure stored on an electronic database that includes metadata corresponding to suggested edits, according to an illustrative embodiment.

FIGS. 1-3 are diagrams of a network and database structures that may be used to implement the systems and methods disclosed herein. FIG. 1 is a block diagram of a computerized system 100 for detecting relationships between edits and acting on a subset of edits, according to an illustrative embodiment. System 100 includes a server 104 and four user devices 113a-113d (generally, user device 113) connected over a network 101. The server 104 includes a review manager 102, which manages updates to various versions of a master document 106.

The review manager 102 is configured to transmit and receive data over the network 101 in communication with user devices 113. In particular, the review manager 102 receives data indicative of changes that a user at a user device 113 wishes to suggest or create related to the master document 106. Depending on the user type, which sets the access permissions for the user to access the master document 106, the review manager 102 then creates these changes by appending to a list of suggestions 105 corresponding to the master document 106. The list of suggestions 105 may be stored in the form of a data structure, an example of which is described in more detail in relation to FIG. 3.

The review manager 102 may include a processor and a memory unit. The memory unit stores computer executable instructions, which are executed by the processor. The computer executable instructions include instructions for receiving data over the network 101, determining a user type for a given user, making changes in the master document 106, and publishing various versions of the document 106 to various users. As depicted in FIG. 1, the master document 106 is stored on a separate device from the server 104, but the master document 106 may also be stored in the electronic database 103 or even in the memory unit included within the review manager 102. In addition, any data described herein as being stored on the electronic database 103 may instead or additionally be stored in a memory unit in the review manager 102 or on a separate memory unit external to the server 104.

Users at user devices 113 may simultaneously interact with the master document 106 over user interfaces 110 or 114. In particular, FIG. 1 depicts four users, each associated with a user type defining a level of authority for access to and editing capabilities of certain versions of the master document. Specifically, FIG. 1 depicts three reviewers 112a-112c (generally, reviewer 112) and one editor 108. Each reviewer 112 interacts with the master document 106 over a reviewer interface 114a-114c (generally, reviewer interface 114), and the editor 108 interacts with the master document over an editor interface 110.

Each user device 113 may include a device such as a personal computer, a laptop computer, a tablet, a smart phone, a personal digital assistant, or any other suitable type of computer of communication device. Users at the user devices access and receive information from the server 104 over the network 101. The user devices 113 may include typical components, for example, an input device, an output device, and a communication interface (e.g., editor interface 110 or reviewer interfaces 114). A user may authenticate with the server 104 by inputting a user name and password (or providing other identification information) via a user interface, such that the same user device may be used by different users at different times, including users with the same or different user type.

Users interact with the server 104 such that the users, in conjunction with the server 104, execute an online document by collaboratively proposing changes in the document 106. Although illustrated as a single device in FIG. 1, the server 104 may be implemented as, for example, a single computing device or as multiple distributed computing devices. The interaction of users with the server 104 is through user interfaces 114 and 110, which may include web browsers. For example, the document may be viewed with an application that displays the document within a web browser. In this arrangement, users do not need to install software locally to their user devices to view and make changes in the document. When browsers or user interfaces are discussed herein, these terms are intended to refer to any program that allows a user to browse documents, regardless of whether the browser program is a standalone program or an embedded program, such as a browser program included as part of an operating system. The logic described herein can be implemented in hardware, software, firmware, or a combination thereof.

In an example, the document 106 is a text document. One of skill in the art will understand that the features and concepts described herein may be applied in any type of collaborative document application, including, for example, spreadsheet applications, presentation applications, drawing applications, and others.

One type of document user is reviewer 112, who has certain authority and access to the document. Typically a reviewer may view and make suggested edits and comments on the document 106. To do this, the reviewer 112 views a version of the document on the reviewer interface 114 and makes a change to the document. Data indicative of the change is sent over the network 101 to the server 104, where the review manager 102 receives the data and adds the data to the list of suggestions 105 associated with the document 106. The change may be a suggested edit to the document 106, such as an insertion, deletion, replacement, move, format change, or any other suitable change in a document. In another example, the change may be a comment on the document 106 or a portion thereof. Changes of different types (such as insertions, deletions, replacements, moves, format changes, or comments, for example) may be saved differently in the list of suggestions 105. For example, different lists may be used to store changes of different types. As another example, changes of different types may be stored together as entries in one list, with each entry having a label indicative of the change type.

Another user type is an editor 108, who has a greater level of authority for the document 106 than the reviewer 112. The editor 108 can accept or reject any suggested edits made by the reviewer 112, and further can delete any comments made by the reviewer 112. Access and authority may vary and be customized for a document allowing different access and use capabilities for different users. When a reviewer (such as reviewer 112a) makes a suggested edit to the document 106, the editor 108 is prompted to either accept or reject the suggested edit. When a suggested edit is accepted by the editor 108, the review manager 102 converts the suggested edit into an accepted edit and updates the master document

106 with the accepted edit. In addition, the accepted edit may be removed from the list of suggestions 105, or an indicator label may be set for the accepted edit to indicate that the edit has been accepted. If the editor 108 rejects a suggested edit, the review manager 102 removes the suggested edit from the list of suggestions 105, or an indicator label may be set for the edit to indicate that the edit has been rejected or dismissed.

In addition to accepting or rejecting changes made by the reviewer 112, the editor 108 also has access to make direct changes in the document by directly editing or making comments on the document 106. The review manager 102 treats edits made by the editor 108 as accepted edits which are automatically accepted. Alternatively, the editor 108 may wish to make a suggested edit in order to get input from the reviewer 112 or other editors regarding the suggested edit. In this case, the editor 108 may mark an edit as "suggested" or may set the user device 109 to operate in "suggestion mode," such that the suggested edit appears in the list of suggestions 105 of the document to the reviewer 112. Then, the reviewer 112 may modify the suggested edit or comment on the suggested edit, and the editor 108 may then decide whether to accept or reject the suggested edit(s).

The updates to the master document 106 and the list of suggestions 105 are performed nearly in real-time. This means that when the reviewer 112 and the editor 108 are simultaneously viewing and accessing the document, the reviewer 112 receives feedback regarding a suggested edit almost immediately after the editor 108 sends the feedback. The system 100 is especially advantageous for the case when a suggested edit made by the reviewer 112 may affect additional suggested edits made by the reviewer 112. For example, it is helpful for the reviewer 112 to receive early feedback from an editor 108 regarding a suggested edit because the feedback may influence future suggested edits.

In addition to managing the list of suggestions 105 for the master document 106, the review manager 102 also keeps track of relationships between suggested edits in the list of suggestions 105. In particular, the review manager 102 includes a compound identifier and/or a conflict identifier. The compound identifier may identify a shared position between two or more suggested edits in the document 106 and may determine that the suggested edits that share a position in the document 106 have a "compounding relationship," which is described in more detail below. In addition, the conflict identifier may identify a shared position between two or more suggested edits in the document 106 and may determine that the suggested edits that share a position in the document 106 have a "conflicting relationship," which is described in more detail below. Any identified compounding and/or conflicting relationships associated with the master document 106 may be stored even when the master document 106 is closed. In this case, the relationships may be loaded from a stored location when the document 106 is loaded or displayed. Alternatively, the relationships may be discarded when the document 106 is closed, and the review manager 102 may identify compounding and/or conflicting relationships each time the document 106 is loaded or displayed.

As an example, two suggested edits may have a compounding relationship if one of the suggested edits is dependent on the other suggested edit. For example, the reviewer 112*a* may make a first suggested edit such as an insertion of some text into the document 106. Then, the reviewer 112*b* may make a second suggested edit such as a change within the suggested insertion made by reviewer 112*a*. For example, the reviewer 112*b* may suggest making another insertion, making a deletion, fixing a spelling mistake, or any other change of the suggested insertion made by reviewer 112*a*. In this case, the second suggested edit has a compounding relationship with the first suggested edit, and when the second suggested edit is made, the review manager 102 detects the compounding relationship and may store an indication of the compounding relationship in the list of suggestions 105. An example view of a display of a document 106 with compounding suggested edits is shown and described in more detail in relation to FIGS. 5 and 6. After a compounding relationship is identified by the compound identifier, an indication of the compounding relationship is stored and displayed to a user such as an editor 108. The review manager 102 thus provides visual indicators of the relationships for an editor 108. These visual indicators may be useful for the editor 108 in making decisions regarding whether to accept or reject a suggested edit. In particular, for suggested edits with compounding relationships, acceptance of the second suggested edit is contingent upon acceptance of the first suggested edit. That is, in order for the editor 108 to accept the second suggested edit, the first suggested edit must also be accepted. Thus, if the editor 108 accepts the second suggested edit, the review manager 102 may automatically also update the first suggested edit as accepted without additionally prompting the editor 108 to accept the first suggested edit. Therefore, knowledge of any compounding relationships between suggested edits may lead to efficient development of the document 106.

In another example, two suggested edits may have a "conflicting" relationship if one of the suggested edits conflicts with the other suggested edit. For example, a first suggested edit may be a deletion of a segment of text, and a second suggested edit may be an insertion of some text within the deleted segment. In this case, the first and second suggested edits have a conflicting relationship, meaning that the editor 108 may not accept both suggested edits. After a conflicting relationship is identified by the conflict identifier, an indication of the conflicting relationship is stored and displayed to a user such as an editor 108. The review manager 102 thus provides visual indicators of the relationships for an editor 108. Thus, if the editor 108 accepts the first suggested edit, the review manager 102 may automatically update the second suggested edit as rejected. In this case, the editor 108 implicitly rejects the second suggested edit by accepting the first suggested edit. Similarly, if the editor 108 accepts the second suggested edit, the review manager 102 may automatically update the first suggested edit as rejected. In this case, the editor 108 implicitly rejects the first suggested edit by explicitly accepting the second suggested edit. Therefore, knowledge of any conflicting relationships between suggested edits may lead to efficient development of the document 106 because the system 100 exploits the relationships between edits. In particular, the review manager 102 automatically accepts or rejects edits that the editor 108 has implicitly accepted or rejected based on decisions that the editor 108 has made regarding other edits. An example of a data structure for storing the list of suggestions 105 is described in more detail in relation to FIG. 3.

When the interfaces 110 and 114 include web browsers, different versions of the document (for example, a markup version, a clean version, or various historical versions of the document, such as those including a selected group of the suggested and/or accepted edits) may be saved to different network locations. The editor 108 may select which versions of the master document 106 are saved to which network location, and may further select to display a version of the document in a particular format, such as in browser format, html format, or any other suitable format for displaying an electronic document. In addition, a user such as a reviewer 112 and/or an editor 108 may select to view the master document 106 including any suggested edit satisfying one or more criteria. As an example, a user may wish to view only suggested edits of a certain type, such as insertions, deletions, replacements, format changes, spelling mistakes, or any other suitable type of suggested edit.

The reviewer 112 and the editor 108 may view who else is currently viewing the document. When more than one user views the document at a time, the users may communicate with each other over an instant messaging application.

One editor and three reviewers are shown in FIG. 1 to avoid complicating the drawing; however the system 100 can support any number of users with the same or different user type. When there are multiple reviewers, a reviewer (i.e., reviewer 112*a*) may view suggested edits and comments made by other reviewers (i.e., reviewers 112*b* and 112*c*) or editors. In this way, by allowing for efficient collaboration across a set of users proposing changes in a document, the system 100 offers significant advantages over a system in which reviewers independently propose changes in a document. Thus, when an editor 108 views the document, the editor 108 may view a live stream of collaborative updates made by multiple reviewers 112 at the same time, significantly reducing the amount of time to develop the document. In addition, a third type of user is a viewer (not shown), who may view the document 106 including any accepted edits, but not any pending suggested edits (that have not yet been accepted or rejected). In some implementations, a viewer may be allowed to view pending suggested edits.

In certain implementations, each user may be assigned a unique color, such that the changes of a version of the document are color-coded by the user who made the changes. In addition, changes made by editors 108 may be marked differently on view of the document from changes made by reviewers. Further, a user may select to view the document 106 including all suggested edits of a certain type, such as all suggested edits made by a particular user or type of user, or all suggested edits corresponding a specific edit type, such as all insertions, deletions, replacements, moves, format changes, spelling changes, or any other suitable edit type. An editor 108 may, at once, accept or reject all suggested edits made by a particular user or all suggested edits corresponding to a specific edit type.

FIG. 2 is an example data structure 117 stored on electronic database 103 that includes a document access control list, according to an illustrative embodiment. The document access control list includes a list of users who have access to a version of the master document 106 and their corresponding user types. In this case, multiple users have the same user type. In particular, there are three reviewers (users A-C) and one editor (user D), all of whom may simultaneously interact with the master document 106.

FIG. 3 depicts an exemplary data structure 118 stored on the electronic database 103 that includes metadata corresponding to suggested edits, according to an illustrative embodiment. The data structure 118 includes four records of suggested edits. Each record in the data structure 118 includes a "suggested edit id" field whose values include identification numbers for the edits. Each record in the data structure 118 corresponds to a suggested edit and further includes the user id of the user who suggested the edit, an indicator of any other suggested edit that has a conflicting relationship with the corresponding suggested edit, an indicator of any other suggested edit that has a compounding relationship with the corresponding suggested edit, and an edit type associated with the suggested edit (i.e., addition, deletion, move, replacement, format changes, spelling changes, or any other suitable edit type). The data structure 118 indicates that the suggested edits 574 and 687 conflict with each other, meaning at most one of suggested edits 574 and 687 will be accepted by an editor 108. The data structure 118 also indicates that the suggested edit 1345 compounds on the suggested edit 1254, indicating that the suggested edit 1345 is dependent on the suggested edit 1254. The data structure 118 is shown for illustrative purposes only, and other fields with additional data may also be included. Examples of such additional data include the time of the suggested edit, whether the suggested edit was accepted or rejected, who accepted or rejected the suggested edit, the time of the acceptance or rejection, and the location in the document 106 of the suggested edit. Furthermore, when a suggested edit includes deleting, moving, or replacing existing objects in the document, the data structure 118 may further include which objects to delete, move, or replace. Similarly, when a suggested edit includes adding objects, the data structure 118 may further include which object(s) to add.

In some embodiments, the data related to a suggested edit may be stored as a mutation of the document. For example, a mutation may include data indicating changes made by the edit such as the user id of the user who created the suggested edit, deletions, additions, location of the edit, and a status of the edit, such as pending, rejected, or accepted.

Figure 4:
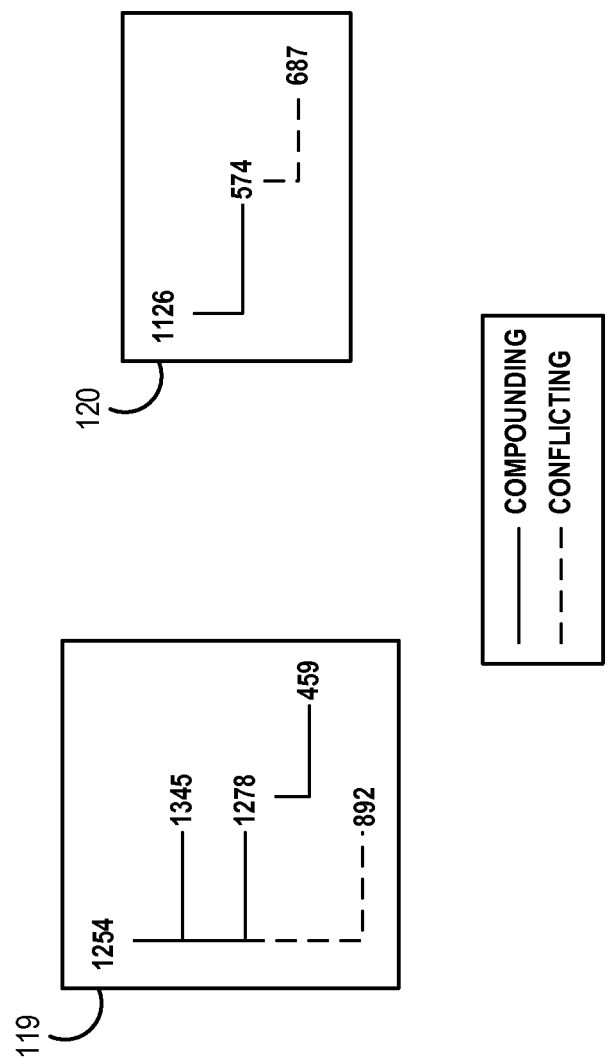
FIG. 4 are example tree diagrams for visualizing compounding and conflicting relationships between multiple suggested edits, according to an illustrative embodiment.

FIG. 4 depicts two exemplary tree diagrams for visualizing the relationships across various suggested edits, according to an illustrative embodiment. In particular, solid lines connecting two suggested edits indicates that the connected edits have a compounding relationship, and dashed lines indicate a conflicting relationship. In response to receiving an acceptance or a rejection of a first suggested edit in the trees 119 or 120 from an editor 108, the review manager 102 may parse the trees 119 or 120 to automatically accept or reject suggested edits that have some relationship to the first suggested edit. Acceptance or rejection of the first suggested edit may be referred to as a direct change of the document, and acceptance or rejection of other suggested edits that have some relationship to the first suggested edit may be referred to as indirect changes of the document. This process is explained in more detail below.

The tree diagram 119 indicates that suggested edits 1345 and 1278 each depend on, and has a compounding relationship with, suggested edit 1254. That is, acceptance of either suggested edit 1345 or 1278 would require acceptance of suggested edit 1254. In addition, suggested edit 459 depends on, and has a compounding relationship with, suggested edit 1278. Thus, acceptance of suggested edit 459 requires acceptance of both suggested edits 1254 and 1278. Furthermore, suggested edit 892 has a conflicting relationship with suggested edit 1254. That is, acceptance of suggested edit 1254 would require rejection of suggested edit 892, and acceptance of suggested edit 892 would require rejection of suggested edit 1254. In an example, an editor 108 directly accepts suggested edit 892, and the review manager 102 parses the tree 119 to determine suggested edits related to suggested edit 892. In particular, the review manager 102 automatically rejects suggested edit 1254 and further automatically rejects any suggested edits that require the acceptance of suggested edit 1254, such as suggested edits 1345, 1278, and 459. Thus, direct acceptance of suggested edit 892 results in indirect changes of the statuses of other suggested edits in the tree 119. In another example, the editor 108 directly accepts suggested edit 459. In this case, the review manager automatically accepts suggested edits 1254 and 1278 and automatically rejects suggested edit 892. Furthermore, the acceptance of suggested edit 459 has no effect on the status of suggested edit 1345, which remains pending. In another example, the editor 108 directly rejects suggested edit 1254. In this case, the review manager automatically rejects suggested edits 1345, 1278, and 459, and the status of suggested edit 892 remains pending.

The tree diagram 120 indicates that suggested edit 574 has a compounding relationship with suggested edit 1126 and a conflicting relationship with suggested edit 687. In particular, suggested edit 574 depends on suggested edit 1126 such that acceptance of suggested edit 574 requires acceptance of suggested edit 1126. In an example, an editor 108 directly accepts suggested edit 574, and the review manager 102 automatically accepts suggested edit 1126 and automatically rejects suggested edit 687. In another example, an editor 108 directly accepts suggested edit 1126. In this case, both suggested edits 574 and 687 remain pending. The status of suggested edit 574 is unchanged because acceptance of suggested edit 1126 is necessary, but not necessarily sufficient, for acceptance of suggested edit 574. In another example, an editor 108 directly rejects suggested edit 1126, and the review manager automatically rejects suggested edit 574. The status of suggested edit 687 remains pending because rejection of suggested edit 574 is necessary, but not necessarily sufficient, for acceptance of suggested edit 687. In another example, an editor 108 directly accepts suggested edit 687, and the review manager 102 automatically rejects suggested edit 574 and accepts suggested edit 1126. In an example, the suggested edit 1126 includes an inserted paragraph, and the suggested edit 574 includes a deleted sentence within the inserted paragraph. Furthermore, the suggested edit 687 is an inserted word in the deleted sentence. In this case, when an editor 108 accepts the suggested edit 687, the suggested edit 574 may be automatically rejected, and the suggested edit 1126 may be automatically accepted.

The tree diagrams 119 and 120 are examples of data structures for storing relationships between suggested edits in a document 106. The tree diagrams 119 and 120 each show three levels of suggested edits and are simplified for illustrative purposes. In general, the relationships among suggested edits may be more complex and may include any number of levels. Representing the relationships among suggested edits in tree structures such as tree diagrams 119 and 120 allows for the review manager 102 to efficiently determine which suggested edits should be automatically accepted or rejected based on an acceptance or a rejection of a first suggested edit.

Data structures 117-120 and the master document 106 may be stored on the same electronic database 103, or may be stored on different databases. In some embodiments, an original version of the master document 106 is stored on a database. For example, the combination of the original version and data structure 118 would be enough to generate versions of the document using a dynamic approach. In particular, if a user wishes to view only a subset of the suggested edits, a version of the document may be generated including the original version and the subset of suggested edits. The subset may include those suggested edits corresponding to a specific user, a user type, or an edit type. The generated version may not be stored on a database. Instead, when a user accesses the document, a version specific to that user (based on the user's settings) may be generated.

In addition to the data stored in example data structures 117-120, the review manager 102 may also store additional data. For example, data indicative of how all users interact with the document may be stored such as what portions of the document are most viewed or read.

FIGS. 5-17 are diagrams of exemplary displays of a user interface for users interacting with the master document 106. In particular, FIGS. 5-10 are exemplary displays of a reviewer interface 114 (FIGS. 5-6) and an editor interface 110 (FIGS. 7-10) when the document 106 includes a pair of compounding edits. FIGS. 11-16 are exemplary displays of a reviewer interface 114 (FIGS. 11-13) and an editor interface 110 (FIGS. 14-16) when the document 106 includes a pair of conflicting edits. FIG. 17 is an exemplary display of an editor interface 110 including a set of editor display options.

FIGS. 5-6 are exemplary diagrams 500-600 of a display of a reviewer interface 114 for a reviewer 112 interacting with the master document 106, according to an illustrative embodiment. In particular, the display of the reviewer interface 114 may be updated in real time such that a reviewer 112 (i.e., the reviewer 112*a*) is informed in real time of changes (i.e., in the form of suggested edits or comments) of the document 106 made by other users (i.e., the reviewers 112*b* and 112*c* and the editor 108). In this way, the reviewer 112*a* may make his/her own informed changes of the document 106 in view of the latest suggestions made by all the other collaborators on the document 106. Therefore, the systems and methods described herein promote efficient collaboration for editing a document 106.

The diagram 500 includes a portion of an original document 106 with a suggested edit 1254. In particular, the suggested edit 1254 includes the addition of a sentence to the document and is distinguished from a remainder of the document by a box surrounding the text. In addition, the diagram 500 includes a sidebar on the right hand side of the reviewer interface 114 for displaying metadata associated with the suggested edit 1254. In particular, the sidebar includes a metadata region 224 associated with the suggested edit 1254. The metadata region 224 includes data indicative of which user made the suggested edit 1254 (i.e., Reviewer A), the edit type corresponding to the suggested edit 1254 (i.e., an addition), the time and date the suggested edit was made (i.e., 10:00 AM today), and an indication of the object to be added (i.e., "During development of a document."). Metadata shown in the metadata region 224 may be stored in a data structure such as the data structure 118 shown in FIG. 3.

The diagram 600 is similar to the diagram 500, except that the diagram 600 further includes another suggested edit 1345. The suggested edit 1345 includes the addition of a word "electronic" to the sentence added by the suggested edit 1254. In addition, the sidebar on the right hand side of the reviewer interface 114 includes another metadata region 228 associated with the suggested edit 1345. The metadata region 228 indicates that the suggested edit 1345 includes the addition of a word "electronic" and was made by Reviewer B. The metadata region 1345 further includes an indication of the date and time that Reviewer B made the suggested edit 1254. The suggested edit 1345 is distinguished from a remainder of the document by a box with dotted lines surrounding the text. As an indication that the metadata region 228 corresponds to the suggested edit 1345, the metadata region 228 is also surrounded by a box with dotted lines. Metadata shown in the metadata region 228 may be stored in a data structure such as the data structure 118 shown in FIG. 3.

When Reviewer B makes the suggested edit 1345, the review manager 102 determines that the suggested edit 1345 has a compounding relationship with the suggested edit 1254. In particular, the review manager 102 determines that acceptance of the suggested edit 1345 depends on the acceptance of the suggested edit 1254. To display an indication of the compounding relationship between the suggested edits 1254 and 1345, the metadata region 228 is displayed within the metadata region 224.

When Reviewers A and B make the suggested edits 1254 and 1345, respectively, the review manager 102 may receive data indicative of the suggested edits 1254 and 1345 over the network 101 and may accordingly update the list of suggestions 105. Furthermore, the data structure 118 shown in FIG. 3 and the tree diagrams 120 shown in FIG. 4 may also be updated as new suggested edits are received over the network 101.

The diagrams 500 and 600 are exemplary displays and are shown for illustrative purposes only. In particular, one of ordinary skill in the art will appreciate any combination of metadata associated with suggested edits may be displayed in any number of ways on the reviewer interface 114. For example, the metadata regions 224 and 228 may include only a portion of the text to be added. When a reviewer selects, via user input (such as with a mouse click or with keyboard input), a region surrounding a suggested edit 1254 or 1345 or a metadata region 224 or 228, the selected metadata region and/or the suggested edit may be highlighted with color or distinguished in any other way from a remainder of the document 106. The diagrams 500 and 600 show that the suggested edits 1254 and 1345 are distinguished from a remainder of the document by boxes surrounding the text. However, any method of distinguishing suggested edits such as 1254 and 1345 from a remainder of the document 106 may be used, including using different colors for different reviewers, different colors for different types of edits, underlining added items, striking out removed items, redlining the view of the document, or any other suitable method of distinguishing suggested edits in a document.

FIGS. 7-10 are exemplary diagrams 700-1000 of an editor interface 110 while an editor 108 interacts with the document 106, according to an illustrative embodiment. In particular, the diagram 700 is an example display of the editor interface 110 when the editor 108 is prompted to accept or reject one or more of the suggested edits 1254 or 1345. The diagrams 800-1000 are example displays of the editor interface 110 when an editor 108 makes a selection to accept or reject a suggested edit 1254 or 1345. Because the suggested edits 1254 and 1345 have a compounding relationship, acceptance or rejection of one suggested edit may have an effect on the acceptance or rejection of the other.

The diagram 700 for the editor 108 includes a similar view as in diagram 600 for a reviewer 112, with the exception that the diagram 700 includes several additional options. In particular, the diagram 700 includes an editor display options button 334 (described in more detail in relation to FIG. 17) and decision boxes 330 and 332. The decision boxes 330 and 332 correspond to the suggested edits 1254 and 1345, respectively, and are prompts for the editor 108 to make a selection to accept or reject the corresponding suggested edits. When the editor 108 provides a user input (in the form of selecting one of the options in the decision box 330 or 332), the display of the mark-up version of the document will be updated to reflect the selection made by the editor 108.

As an example, the diagram 800 is a view of the display of the editor interface 110 when the editor 108 has accepted the suggested edit 1345 by providing user input to the decision box 332. In this case, because the suggested edit 1345 has a compounding relationship with 1254, meaning that acceptance of suggested edit 1345 requires acceptance of the suggested edit 1254, the review manager 102 therefore automatically accepts the suggested edit 1254 in response to receiving an acceptance of the suggested edit 1345 from the editor 108. In an example, the review manager 102 determines the compounding relationship between the suggested edits 1345 and 1254 by referring to the data structure 118 or the tree diagram 119, or using any other suitable method for identifying a compounding relationship between two or more suggested edits.

When the editor 108 selects to accept the suggested edit 1345, the status of the suggested edit 1345 is updated. To update the status of the suggested edit 1345, the review manager 102 may update an entry indicative of the status of the suggested edit 1345 in a data structure such as the data structure 118. Examples of statuses for suggested edits include pending (i.e., if the editor 108 has not yet selected to accept or reject the suggested edit), accepted (i.e., if the editor 108 accepts the suggested edit), or rejected (i.e., if the editor 108 rejects the suggested edit). In this case, the status of the suggested edit 1345 would be updated from pending to accepted upon receiving the acceptance from the editor 108. Furthermore, an update in the status to the suggested edit 1345 requires updates to the status of the suggested edit 1254. In this case, updates to the status of the suggested edit 1254 may also require updates to the data entry corresponding to the suggested edit 1254 in the diagram 118 as well as updates to the tree diagrams 119 and 120. In addition, an indication of the identification of an editor 108 who accepted or rejected a suggested edit may be saved in a data structure such as the data structure 118. Then, when other editors view the document 106 or a history of the document 106, the identification of the editor 108 who made changes to the document 106 may be determined.

In addition, when the editor 108 accepts the suggested edit 1345, the view of the document is also updated. In particular, the boxes surrounding the suggested edits 1254 and 1345 are removed in the diagram 800 to indicate that the editor 108 has accepted the addition of the sentence suggested by Reviewer A and the word "electronic" suggested by Reviewer B. Furthermore, the decision box 330 may include an indication that the suggested edit 1254 (corresponding to metadata region 224) has also been automatically accepted (not shown). The update to the view of the document 106 may be displayed in real time to any user viewing the document. In certain implementations, upon receiving an acceptance of a suggested edit from the editor 108, the metadata regions corresponding to the affected suggested edit(s) are removed from the sidebar. In other implementations, the user interacting with the document 106 may be shown an indication that the suggested edit(s) have been accepted in the sidebar. The indication may correspond to a compressed version of the metadata region, an icon, or any other suitable indication.

In another example, the diagram 900 is a view of the display of the editor interface 110 after the editor 108 has accepted the suggested edit 1254 by providing user input to the decision box 330 (not shown). Upon receiving acceptance of the suggested edit 1254, the review manager 102 removes the decision box 330 from the sidebar. As a result of the acceptance of the suggested edit 1254, the sentence that Reviewer A added is updated in the master document 106, and the box surrounding the sentence (indicating that the suggested edit 1254 was previously pending) has been removed. Removal of the box surrounding the sentence is indicative that the addition of the sentence has been accepted by an editor 108.

Furthermore, acceptance of the suggested edit 1254 has no effect on the status of the suggested edit 1345. In particular, the compounding relationship between suggested edits 1254 and 1345 was such that acceptance of the suggested edit 1345 required acceptance of the suggested edit 1254. However, acceptance of the suggested edit 1254 has no effect on the status of the suggested edit 1345. Therefore, compounding relationships such as the one between suggested edits 1254 and 1345 are directional. In this case, the status of the suggested edit 1345 is unchanged such that the status remains pending. Therefore, the editor interface 110 still displays the decision box 332, which prompts the editor 108 to accept or reject the suggested edit 1345.

In another example, the diagram 1000 is a view of the display of the editor interface 110 when the editor 108 rejects the suggested edit 1254 by providing user input to the decision box 330. In this case, because the suggested edit 1345 has a compounding relationship with the suggested edit 1254, meaning that rejection of the suggested edit 1254 additionally requires rejection of the suggested edit 1345. The review manager 102 therefore automatically rejects the suggested edit 1345 in response to receiving a rejection of the suggested edit 1254 from the editor 108. In an example, the review manager 102 determines the compounding relationship between the suggested edits 1345 and 1254 by referring to the data structure 118 or the tree diagram 119, or using any other suitable method for identifying a compounding relationship between two or more suggested edits.

When the editor 108 selects to reject the suggested edit 1254, the status of the suggested edit 1345 is updating by updating an entry indicative of the status of the suggested edit 1254 in a data structure such as the data structure 118. In this case, the status of the suggested edit 1254 would be updated from pending to rejected upon receiving the rejection from the editor 108. Furthermore, an update in the status to the suggested edit 1254 requires updates to the status of the suggested edit 1345. In this case, updates to the status of the suggested edit 1254 may also require updates the data entry corresponding to the suggested edit 1345 in the diagram 118 as well as updates to the tree diagrams 119 and 120.

In addition, when the editor 108 rejects the suggested edit 1254, the view of the document is also updated. In particular, the additions corresponding suggested edits 1254 (sentence) and 1345 (the word "electronic") are removed in the diagram 1000 to indicate that these additions were rejected by an editor 108. In particular, the editor 108 has directly rejected the addition of the sentence suggested by Reviewer A and indirectly rejected the addition of the word "electronic" suggested by Reviewer B. The update to the view of the document 106 may be displayed in real time to any user viewing the document.

In certain implementations, when the editor 108 makes a direct change to the document 106 by accepting or rejecting a suggested edit, the review manager 102 prompts the editor 108 for confirmation to make the indirect changes that are required by the direct change. In certain implementations, indirect changes of the document 106 are displayed differently than direct changes (through the use of different colors or different format styles, for example). In certain implementations, upon receiving a rejection of a suggested edit from the editor 108, the metadata regions corresponding to the affected suggested edit(s) are removed from the sidebar. In other implementations, the user interacting with the document 106 may be shown an indication that the suggested edit(s) have been rejected in the sidebar. The indication may correspond to a compressed version of the metadata region, an icon, or any other suitable indication.

In certain implementations, the review manager 102 is configured to allow an editor 108 to undo a previous acceptance or rejection of a suggested edit. For example, the editor 108 may reject the suggested edit 1254. In this case, the review manager 102 may automatically reject the suggested edit 1345 because rejection of the suggested edit 1254 requires rejection of the suggested edit 1345. However, even after the suggested edit 1345 is indirectly rejected by the editor 108, an indication of the suggested edit 1345 may still be displayed to the editor 108 over the editor interface 110. For example, the indication may be an icon in the sidebar of the editor interface 110, and the editor 108 may select to view the rejected suggested edit 1345 by hovering over the icon or providing user input such as a mouse click, for example. While viewing the rejected suggested edit 1345, the editor 108 may select to directly accept the suggested edit 1345, effectively undoing the rejections of the suggested edits 1254 and 1345. Alternatively, the editor 108 may confirm rejection of the suggested edit 1345, and the corresponding icon may be removed from the sidebar. Similarly, the editor 108 may undo previous acceptances of suggested edits. The review manager 102 thus allows the editor 108 to review indirect changes that were automatically made in response to direct changes received from the editor 108. Furthermore, the review manager 102 allows the editor 108 to undo previous acceptances or rejections of suggested edits. This feature is useful when it is desirable to allow the editor 108 to review previous decisions made by another editor or to review previous decisions by the same editor 108, in case the editor 108 changes his/her mind. In certain implementations, multiple editors 108 collaborate to make changes in a document 106. In this case, this feature would enable an editor 108 to undo previous acceptances or rejections made by another editor.

FIGS. 11-13 are exemplary diagrams 1100-1300 of a display of a reviewer interface 114 for a reviewer 112 interacting with the master document 106 with conflicting suggested edits, according to an illustrative embodiment.

The diagram 1100 includes a portion of an original document 106 with a suggested edit 574. In particular, the suggested edit 574 includes the deletion of a paragraph in the document 106 and is distinguished from a remainder of the document 106 by lines through the text of the paragraph. In addition, the diagram 1100 includes a sidebar for displaying metadata associated with the suggested edit 574. In particular, the sidebar includes a metadata region 440 associated with the suggested edit 574. The metadata region 440 is similar to the metadata region 224 in the diagram 500. In particular, the metadata region 440 includes data indicative of which user made the suggested edit 574 (i.e., Reviewer C), the edit type corresponding to the suggested edit 574 (i.e., a deletion), the time and date the suggested edit was made (i.e., 9:42 AM today), and an indication of the object to be added (i.e., "Since each review may create a uni . . ."). Metadata shown in the metadata region 440 may be stored in a data structure such as the data structure 118 shown in FIG. 3. In addition, the metadata region 440 includes an option for the user to select to show the suggested edit 574 in the view of the document. In particular, if the show option is selected (as is shown in the diagram 1100), the lines through the text of the paragraph are displayed, indicative of the suggested deletion. Alternatively, if the show option is unselected (as is shown in the diagram 1200), the lines through the text of the paragraph are not displayed, indicative that the suggested deletion is not shown. In the diagram 1200, the metadata region 440 is still displayed in the sidebar of the reviewer interface 114. Optionally, the metadata region 440 may include a compressed version of what is shown in the diagram 1200 when the user selects to not show the corresponding suggested edit. For example, the compressed version may include a shrunken version of the metadata region 440 including a subset of the metadata displayed, or the compressed version may be in the form of an icon.

The diagram 1300 is the same as the diagram 1200, except that the diagram 1300 further includes another suggested edit 687. The suggested edit 687 includes the addition of a word "different" to a section of the document 106. In addition, the sidebar on the right hand side of the reviewer interface 114 includes another metadata region 442 associated with the suggested edit 687. The metadata region 442 indicates that the suggested edit 687 includes the addition of the word "different" and was made by Reviewer B. The metadata region 442 further includes an indication of the date and time that Reviewer B made the suggested edit 687. The suggested edit 687 is distinguished from a remainder of the document by a box with dotted lines surrounding the text. As an indication that the metadata region 442 corresponds to the suggested edit 687, the metadata region 442 is also surrounded by a box with dotted lines. Metadata shown in the metadata regions 440 and 442 may be stored in a data structure such as the data structure 118 shown in FIG. 3.

When Reviewer B makes the suggested edit 687, the review manager 102 determines that the suggested edit 687 has a conflicting relationship with the suggested edit 574. In particular, the review manager 102 determined that acceptance of the suggested edit 687 would require rejection of the suggested edit 574. In addition, acceptance of the suggested edit 574 would require rejection of the suggested edit 687. To display an indication of the conflicting relationship between the suggested edits 687 and 574, the metadata region 442 is displayed within the metadata region 440, and an alert indicative of the conflicting relationship is displayed above the metadata regions 440 and 442.

Furthermore, when the user interacting with the document 106 selects to show one of the suggested edits 687 or 574, the other suggested edit is automatically hidden. In the example display of the diagram 1300, a reviewer has selected to show the suggested edit 687. Therefore, the box surrounding the word "different" is displayed, and the lines through the paragraph suggested to be deleted by the suggested edit 574 are not displayed. As shown in the diagram 1300, even though the suggested edit 574 is not shown in the display of the document, the metadata region 440 corresponding to the suggested edit 574 is still shown in the sidebar of the reviewer interface 114. In certain implementations, a compressed version of the metadata region 440 may be displayed when the corresponding suggested edit is not shown, as described above.

When Reviewers B and C make the suggested edits 687 and 574, respectively, the review manager 102 may receive data indicative of the suggested edits 687 and 574 over the network 101 and may accordingly update the list of suggestions 105. Furthermore, the data structure 118 shown in FIG. 3 and the tree diagrams 120 shown in FIG. 4 may also be updated as new suggested edits are received over the network 101.

In certain implementations, when the editor 108 makes a direct change in the document 106 by accepting or rejecting a suggested edit, the review manager 102 prompts the editor 108 for confirmation to make the indirect changes that are required by the direct change. In certain implementations, indirect changes of the document 106 are displayed differently than direct changes (through the use of different colors or different format styles, for example). In certain implementations, upon receiving a rejection of a suggested edit from the editor 108, the metadata regions corresponding to the affected suggested edit(s) are removed from the sidebar. In other implementations, the user interacting with the document 106 may be shown an indication that the suggested edit(s) have been rejected in the sidebar. The indication may correspond to a compressed version of the metadata region, an icon, or any other suitable indication.

Figure 15:
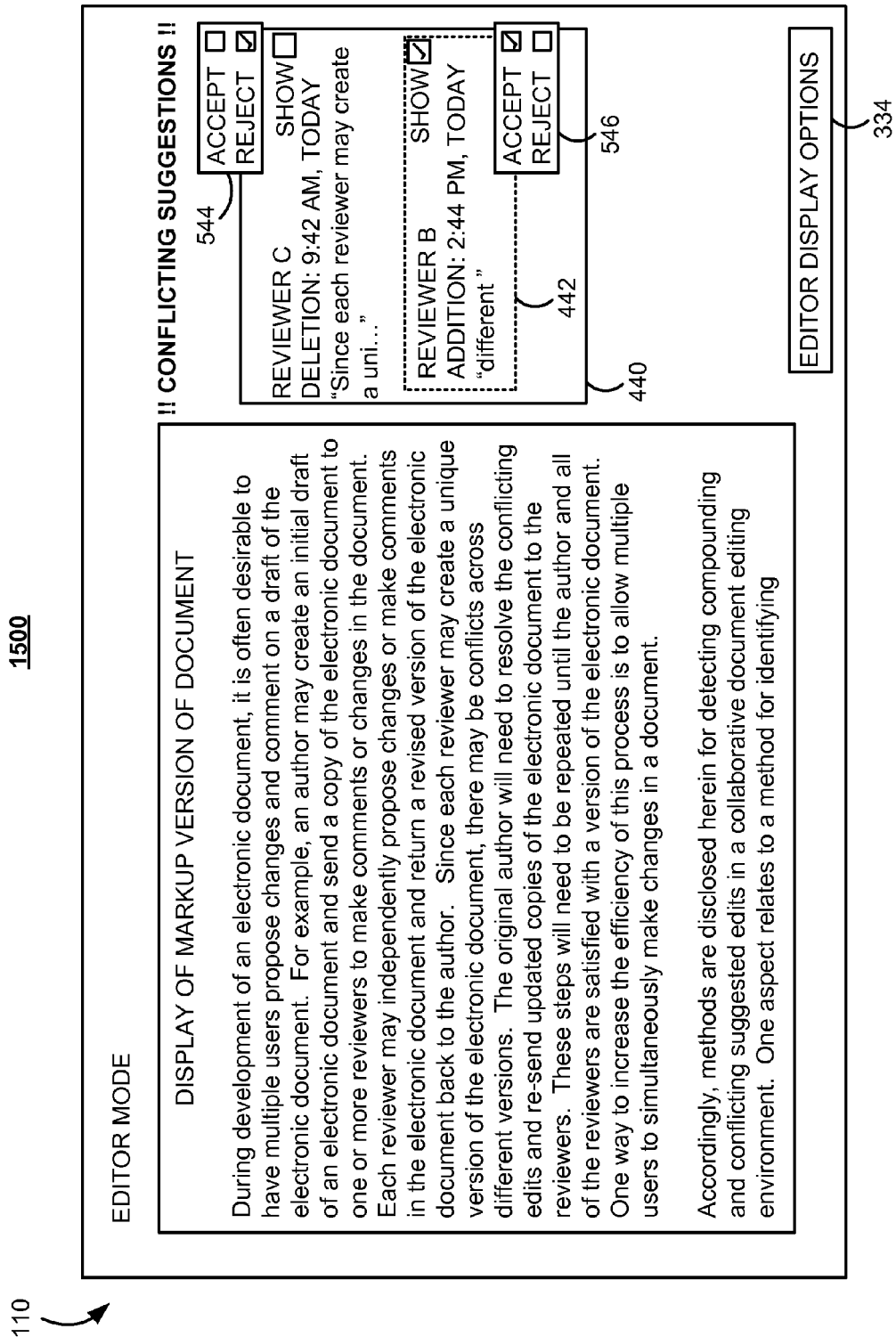
Figure 16:
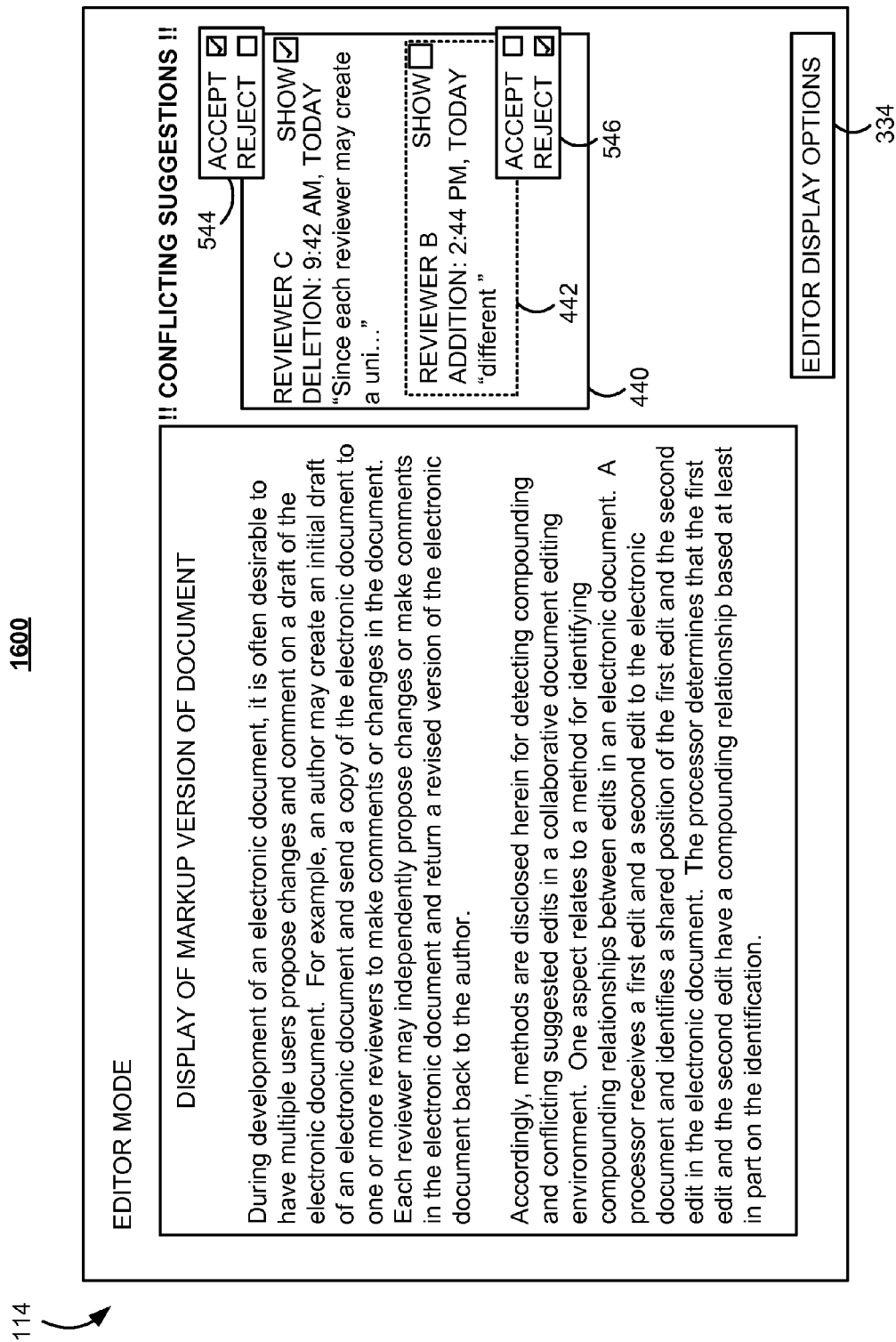
Figure 17:
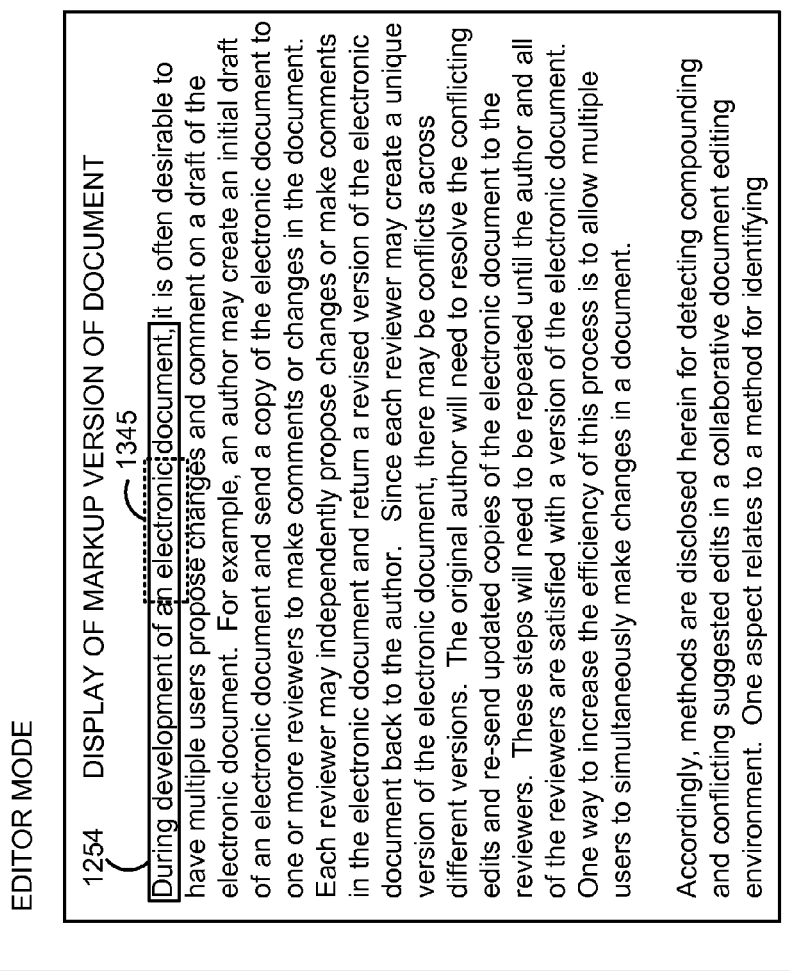
FIG. 17 is a diagram of an exemplary display of an editor interface for displaying a subset of suggested edits in a document, according to an illustrative embodiment.

FIGS. 14-16 are exemplary diagrams 1400-1600 of an editor interface 110 while an editor 108 interacts with the document 106 including conflicting suggested edits, according to an illustrative embodiment. In particular, the diagram 1400 is an example display of the editor interface 110 when the editor 108 is prompted to accept or reject one or more of the suggested edits 574 or 687. The diagrams 1500-1600 are example displays of the editor interface 110 when an editor 108 makes a selection to accept a suggested edit 574 or 687. Because the suggested edits 574 and 687 have a conflicting relationship, acceptance of one suggested edit precludes acceptance of the other suggested edit.

The diagram 1400 for the editor 108 includes a similar view as in diagram 1300 for a reviewer 112, with the exception that the diagram 1400 includes several additional options. In particular, the diagram 1400 includes an editor display options button 334 (described in more detail in relation to FIG. 17) and decision boxes 544 and 546. The decision boxes 544 and 546 correspond to the suggested edits 574 and 687, respectively, and are prompts for the editor 108 to make a selection to accept or reject the corresponding suggested edits. When the editor 108 provides a user input (in the form of selecting one of the options in the decision box 544 or 546), the display of the mark-up version of the document will be updated to reflect the selection made by the editor 108.

As an example, the diagram 1500 is a view of the display of the editor interface 110 when the editor 108 has accepted the suggested edit 687 by providing user input to the decision box 546. In this case, because the suggested edit 687 has a conflicting relationship with the suggested edit 574, the review manager 102 therefore automatically rejects the suggested edit 574 in response to receiving an acceptance of the suggested edit 687 from the editor 108. In an example, the review manager 102 determines the conflicting relationship between the suggested edits 574 and 687 by referring to the data structure 118 or the tree diagram 120, or using any other suitable method for identifying a compounding relationship between two or more suggested edits.

When the editor 108 selects to accept the suggested edit 687, the status of the suggested edit 687 is updated by updating an entry in the data structure 118, for example. Furthermore, the update in the status (i.e., from pending to accepted) to the suggested edit 687 requires updates to the status of the suggested edit 574 (i.e., from pending to rejected). In this case, updates to the status of the suggested edit 574 may also involve updating the data entry corresponding to the suggested edit 574 in the data structure 118 as well as updates to the tree diagrams 119 and 120.

In addition, when the editor 108 accepts the suggested edit 687, the view of the document is also updated. In particular, a markup version of the document no longer includes indications that the suggested edits 687 and 574 are pending (i.e., redline changes indicating the suggested edits 687 and 574 are removed). Furthermore, the decision box 544 includes an indication that the suggested edit 574 (corresponding to metadata region 440) has been automatically rejected.

In another example, the diagram 1600 is a view of the display of the editor interface 110 after the editor 108 has accepted the suggested edit 574 by providing user input to the decision box 544. Upon receiving acceptance of the suggested edit 574, the review manager 102 may remove the decision box 544 from the sidebar. As a result of the acceptance of the suggested edit 574 (which suggested deletion of a paragraph in the document), the deleted paragraph is removed in the master document 106. In addition, the suggested edit 687 is automatically or indirectly rejected because of the conflicting relationship between the suggested edits 574 and 687.

The examples shown in the diagrams 1500 and 1600 indicate that two suggested edits in a conflicting relationship with each other are mutually conflicting, meaning that acceptance of either one requires rejection (or equivalently, precludes acceptance) of the other. However, rejection of a suggested edit does not have an effect on the other. That is, if the suggested edit 574 were rejected, the editor 108 may still be prompted to accept or reject the suggested edit 687, and vice versa.

As described in relation to FIGS. 5-10 for compounding suggested edits, updates to the status of a suggested edit may be performed by updating an entry indicative of the status of the suggested edit in a data structure such as the data structure 118. Furthermore, an update in the status to one suggested edit may require an update to the status of one or more other suggested edits.

In addition, when the editor 108 provides user input to a decision box such as the decision boxes 544 and 546, the view of the document is updated in real time. In particular, the paragraph in the suggested edit 574 is removed from the display of the document because the editor 108 accepted the deletion of the paragraph. In particular, the editor 108 has directly accepted the deletion of the paragraph suggested by Reviewer C and indirectly rejected the addition of the word "different" suggested by Reviewer B.

In certain implementations, when the editor 108 makes a direct change in the document 106 by accepting or rejecting a suggested edit, the review manager 102 prompts the editor 108 for confirmation to make the indirect changes that are required by the direct change. In certain implementations, indirect changes of the document 106 are displayed differently than direct changes (through the use of different colors or different format styles, for example). In certain implementations, upon receiving a rejection of a suggested edit from the editor 108, the metadata regions corresponding to the affected suggested edit(s) are removed from the sidebar. In other implementations, the user interacting with the document 106 may be shown an indication that the suggested edit(s) have been rejected in the sidebar. The indication may correspond to a compressed version of the metadata region, an icon, or any other suitable indication.

FIG. 17 is an illustrative diagram 1700 of a view of the editor interface 110 when an editor 108 interacts with the document 106, according to an illustrative embodiment. In particular, in the diagram 1700, the editor 108 has selected to display the editor display options by selecting the editor display options button 334. When the editor display options button 334 is selected, the sidebar of the editor interface 110 includes a display box 654. In particular, the display box 654 includes a list of display options, and decision options (i.e., reject options 650 and accept options 652) for the editor 108.

In particular, the display box 654 allows the editor 108 to selectively view a subset of all the suggested edits related to the document 106. For example, the editor 108 may wish to view only the suggested edits corresponding to a particular reviewer, or corresponding to a particular type of suggested edit. In this case, the editor 108 would select and deselect the appropriate set of options under the display options in the display box 654. When the editor 108 selects and deselects the display options, the view of the display of the document may be updated in real time. As shown, the editor 108 has selected to view the option corresponding to everyone's activity. Upon selecting this option, each box next to a reviewer's identifier (i.e., Reviewer A, Reviewer B, and Reviewer C) may be automatically selected, and all the suggested edits may be shown in the display. The numbers following the reviewer identifiers correspond to a number of pending suggestions remaining from the reviewer. For example, Reviewer A has five pending suggested edits, Reviewer B has two pending suggested edits, and Reviewer C has three pending suggested edits. The reviewer manager 102 may appropriately update these numbers as the editor 108 accepts or rejects the suggested edits in the document 106.

The display box 654 also allows the editor 108 to selectively view a subset of the suggested edits corresponding to an edit type. The editor 108 may select and deselect the appropriate set of options to display the edits corresponding to one or more desired edit types. As shown, the editor 108 has selected to view all edits, corresponding to comments, additions, deletions, spelling mistakes, and formatting changes. In this case, all the edits, regardless of edit type are shown in the display. The review manager may use the data structure shown in FIG. 3 to easily determine the subset of suggested edits to display in the view of the document.

In an example, the editor 108 may wish to view only those suggested edits corresponding to Reviewer B. To only display the suggested made by Reviewer B, the editor 108 may deselect all reviewers under the display options in the display box 654 except for Reviewer B. However, one of the suggested edits made by Reviewer B (i.e., suggested edit 1345) depends on one of the suggested edits made by Reviewer A (i.e., suggested edit 1254). In this case, the review manager 102 may prompt the editor 108 to determine whether or not to display any suggested edit from which an edit by Reviewer B depends. Depending on the input from the editor 108, the review manager 102 may display both suggested edits 1254 and 1345, or neither suggested edit may be displayed. In an example, the review manager 102 may display all suggested edits made by Reviewer B in addition to any suggested edits on which Reviewer B's suggested edits depend.

In addition, the display box 654 includes two options corresponding to reject options 650 and accept options 652. The options 650 and 652 allow the editor 108 to accept or reject a current edit, which may correspond to a suggested edit in the document 106 and may be highlighted in the document with color, a pointer, or any other suitable way of pointing out an edit in a document. In addition, the options 650 and 652 also allow the editor 108 to accept or reject all visible edits (i.e., corresponding to those edits selected to be displayed under the display options). In particular, it may be desirable for the editor 108 to accept or reject all suggested edits corresponding to a particular reviewer (i.e., Reviewer A). In this case, the editor 108 may select to display only those edits corresponding to Reviewer A, and may select the option 650 to reject all the displayed suggested edits. Alternatively, the editor 108 may select the option 652 to accept all the suggested edits from Reviewer A. As an example, this may be desirable if the editor 108 has enough trust in Reviewer A to accept all of the suggestions made by Reviewer A without reviewing them individually.

It may be desirable for the editor 108 to accept or reject all suggested edits corresponding to a particular edit type. In particular, parsing through each suggested edit may be time consuming, especially when the suggested edits include fixes to spelling mistakes, format changes, or any other minor suggested edits. Thus, the editor 108 may select to display only those edits corresponding to one or more edit types (i.e., spelling mistakes and formatting changes, or the "non-substantive" suggested edits), and select the option 652 to accept all visible edits. Then, the editor 108 may parse through the remainder of the edits (i.e., the "substantive" suggested edits) for individual consideration. These options, which allow the editor 108 to efficiently accept or reject edits corresponding to one or more reviewers or one or more edit types, allow for changes to be made to the document 106 efficiently.

The display box 654 is shown for illustrative purposes only, and one of ordinary skill in the art will appreciate that any subset of the components shown may be combined with any other sort of data related to the document 106 for display.

Figure 18:
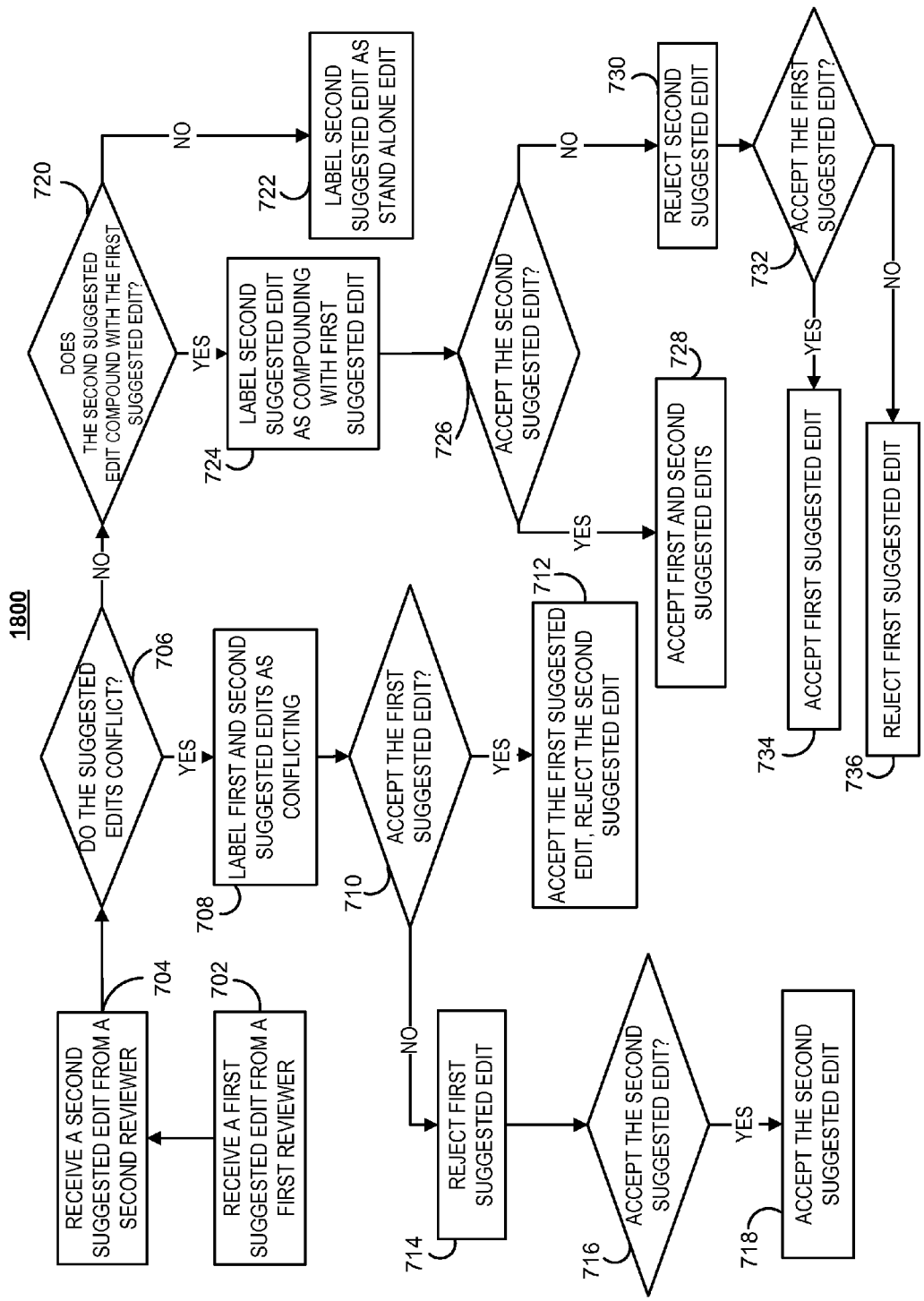
FIG. 18 is a flowchart of a method used by the review manager to manage updates to a document, according to an illustrative embodiment.

FIG. 18 is an illustrative flow diagram of a method 1800 used by the review manager 102 to determine compounding and conflicting relationships between suggested edits to a document 106. The method 1800 includes the steps of receiving a first suggested edit from a first reviewer (step 702) and receiving a second suggested edit from a second reviewer (step 704). The review manager 102 determines whether the suggested edits conflict with each other (decision block 706). If the suggested edits conflict, the review manager 102 labels the first and suggested edits as conflicting edits (step 708) and determines whether to accept the first suggested edit (decision block 710). If the first suggested edit is accepted, the review manager 102 accepts the first suggested edit and rejects the second suggested edit (step 712). Otherwise, if the first suggested edit is rejected, the review manager determines whether to accept the second suggested edit (decision block 716). Alternatively, if the first and second suggested edits do not conflict with each other, the review manager 102 determines whether the second suggested edit compounds with the first suggested edit (decision block 720). If the second suggested edit compounds with the first suggested edit, the review manager 102 labels the second suggested edit as compounding with the first suggested edit (step 724). Then the review manager 102 determines whether the second suggested edit should be accepted (decision block 726). If so, then both the first and second suggested edits are accepted (step 728). Otherwise, the second suggested edit is rejected (step 730), and the review manager determines whether to accept the first suggested edit (decision block 732).

At step 702, the review manager 102 receives a first suggested edit from a first reviewer, and at step 704, the review manager 102 receives a second suggested edit from a second reviewer. The first and second reviewers may be the same or different reviewers. At decision block 706, the review manager 102 determines whether the first and second suggested edits conflict with each other. In particular, in order to determine whether the suggested edits have a conflicting relationship, the review manager 102 may use any type of information related to the document 106. As an example, the review manager 102 may determine that the suggested edits conflict with each other if both suggested edits modify the same portion of the document, and if acceptance of one suggested edit would preclude acceptance of the other suggested edit. For example, when the document 106 is a text document, the first suggested edit may correspond to a deletion of a portion of the text, while the second suggested edit may correspond to an insertion of some text within the portion that the first suggested edit suggested to delete. In this case, the first and second suggested edits conflict because they modify the same portion of the document 106. In another example, the review manager 102 determines that two suggested edits have a conflicting relationship when acceptance of one suggested edit would preclude acceptance of the other suggested edit. So, when the two suggested edits suggest to modify the same portion of the document 106 in different ways, this may be an indication to the review manager 102 that the two suggested edits conflict with each other.

If at decision block 706, the review manager 102 determines that the first and second suggested edits conflict, the review manager 102 labels the first and second suggested edits as conflicting. In particular, labeling the first and second suggested edits as conflicting may include updating a data structure such as the data structure 118 shown in FIG. 3. As an example, a data entry (i.e., a row in the data structure 118 corresponding to the suggested edit) in the data structure may be updated with the suggested edit identifier of the conflicting suggested edit (i.e., third column in the data structure 118). In addition, the two rows of the data structure corresponding to the two conflicting suggested edits may both be updated with the identifier of the conflicting suggested edit. In another example, the review manager 102 may label the first and second suggested edits as conflicting by updating a tree diagram such as the tree diagram 119 or 120 shown in FIG. 4. In particular, if the first suggested edit is already a part of a tree diagram, then the second suggested edit may be added to the tree diagram to indicate the conflicting relationship, or vice versa.

At decision block 710, the review manager 102 determines whether to accept the first suggested edit. As an example, the review manager 102 may make this determination based on a user input such as an input from an editor 108 indicating to accept the first suggested edit. As another example, the review manager 102 may make this determination based on previously received input from the editor 108. In particular, the editor 108 may have accepted a third suggested edit, which may have a compounding relationship with the first suggested edit such that the acceptance of the third suggested edit requires acceptance of the first suggested edit. In this case, upon receiving an acceptance from the editor 108 of the third suggested edit, the review manager 102 may indirectly determine that the first suggested edit is accepted. If the review manager 102 determines that the first suggested edit is accepted at decision block 710, then the review manager 102 proceeds to step 712 to accept the first suggested edit and to reject the second suggested edit. In this case, because the first and second suggested edits have a conflicting relationship, acceptance of one suggested edit would indirectly result in the rejection of the other suggested edit. In certain implementations, the indirect rejection of the other suggested edit may occur automatically. In other implementations, the editor 108 may be prompted to confirm that indirect rejection of the other suggested edit is desired.

Alternatively, the review manager 102 may determine to reject the first suggested edit at decision block 710. In this case, the determination may be made based on a user input from the editor 108 to reject the first suggested edit. In another example, the review manager 102 may have received an acceptance of a fourth suggested edit, which conflicts with the first suggested edits. In this case, the review manager 102 indirectly determines that the first suggested edit is rejected without receiving any explicit instruction from the editor 108 to reject the first suggested edit. The review manager 102 proceeds to step 714 to reject the first suggested edit and to decision block 716 to determine whether to accept the second suggested edit. In this case, if the second suggested edit is to be accepted (similarly decided as described in relation to the decision block 710) then the second suggested edit is accepted at step 718.

If the review manager 102 determines that the first and second suggested edits do not conflict at decision block 706, the review manager 102 proceeds to decision block 720 to determine whether the first and second suggested edits have a compounding relationship. In particular, in order to determine whether the suggested edits have a compounding relationship, the review manager 102 may use any type of information related to the document 106. As an example, the review manager 102 may determine that the suggested edits compound with each other if both suggested edits modify the same portion of the document, and if acceptance of one suggested edit would require acceptance of the other suggested edit. For example, when the document 106 is a text document, the first suggested edit may correspond to an insertion of a portion of text into the document 106, while the second suggested edit may correspond to an edit of the inserted text. In this case, the second suggested edit compounds with the first suggested edit because acceptance of the second suggested edit would require acceptance of the first suggested edit.

In certain implementations, if the first and second suggested edits do not have a compounding relationship, the review manager 102 proceeds to step 722 and labels the second suggested edit as a "stand alone" edit. For example, some indication may be made in data structure 118 to indicate that the first and second suggested edits have neither a conflicting nor a compounding relationship with one another.

If the review manager 102 determines that the second suggested edit compounds with the first suggested edit (i.e., acceptance of the second suggested edit requires acceptance of the first suggested edit), then the review manager proceeds to step 724 to label the second suggested edit as compounding with the first suggested edit. In this case, the review manager 102 may update the data structure 118 with a data entry indicative of the compounding relationship. As an example, the data entry corresponding to the second suggested edit may be updated with the identifier of the first suggested edit to indicate the compounding relationship. In another example, the review manager 102 may update a tree diagram such as the tree diagrams 119 and 120. The review manager 102 may parse through any stored tree diagrams to determine whether any tree has an entry corresponding to the first suggested edit. Any tree diagram including the first suggested edit may be updated by appending the second suggested edit to the first suggested edit and indicating the relationship between the first and second suggested edits.

After the review manager 102 labels the compounding relationship, the review manager 102 determines whether to accept the second suggested edit at decision block 726. In particular, if the review manager 102 determines that the second suggested edit should be accepted (whether this is done by direct user input from the editor 108 or whether acceptance of the second suggested edit has been done automatically by the review manager 102 based on previously received user input from the editor 108 as described above), the review manager 102 proceeds to step 728 to accept both the first and second suggested edits. Because acceptance of the second suggested edit requires on acceptance of the first suggested edit, both suggested edits are accepted at step 728.

Alternatively, if the review manager 102 determines that the second suggested edit is to be rejected at decision block 726, the review manager 102 rejects the second suggested edit at step 730. Because acceptance of the second suggested edit depended on acceptance of the first suggested edit, but not vice versa, the status of the first suggested edit is unchanged and remains pending. In this case, the review manager 102 proceeds to decision block 732 to determine whether to accept the first suggested edit. The acceptance or rejection of the first suggested edit may be determined by receiving explicit user input from the editor 108 or by automatic determination by the review manager 102 as described above. In particular, if the review manager 102 determines that the first suggested edit should be accepted, the review manager 102 proceeds to step 734 to accept the first suggested edit. Otherwise, the review manager 102 rejects the first suggested edit at step 736.

The order of the steps and decision blocks as shown in FIG. 18 are for illustrative purposes only and one of ordinary skill in the art will understand that any suitable order my be used. In particular, as shown as depicted in FIG. 18, the review manager 102 first determines whether the suggested edits have a conflicting relationship at decision block 706. If the suggested edits do not have a conflicting relationship, then the review manager 102 determines whether the suggested edits have a compounding relationship at decision block 720. In some embodiments, the review manager 102 may determine whether the suggested edits have a compounding relationship before determining whether there is a conflicting relationship. The order in which decision blocks 706 and 720 are performed is unimportant, and the review manager 102 may perform the processes in parallel. In an example, the order may be selected based on the relative complexity of the process in which the review manager 102 identifies conflicting and compounding relationships. For example, it may be desirable to execute the decision block (i.e., decision blocks 706 or 720) that is less costly (e.g., in terms of complexity or latency) before executing the other decision block.

In addition, as shown, the method 1800 indicates that when it is determined that the two suggested edits have a conflicting relationship, acceptance or rejection of the first suggested edit is considered at decision block 710 before consideration of the second suggested edit at decision block 716. In this case, the order of consideration of the first and second suggested edits may similarly be flipped without departing from the scope of the systems and methods disclosed herein. Similarly, when the first and second suggested edits have a compounding relationship, the method 1800 includes considering whether to accept or reject the second suggested edit at decision block 726 before considering the first suggested edit at decision block 732. In this case, consideration of either the first or the second suggested edits may be done in either order. In particular, the order may be determined by an order of a received user input by the editor 108.

Figure 19:
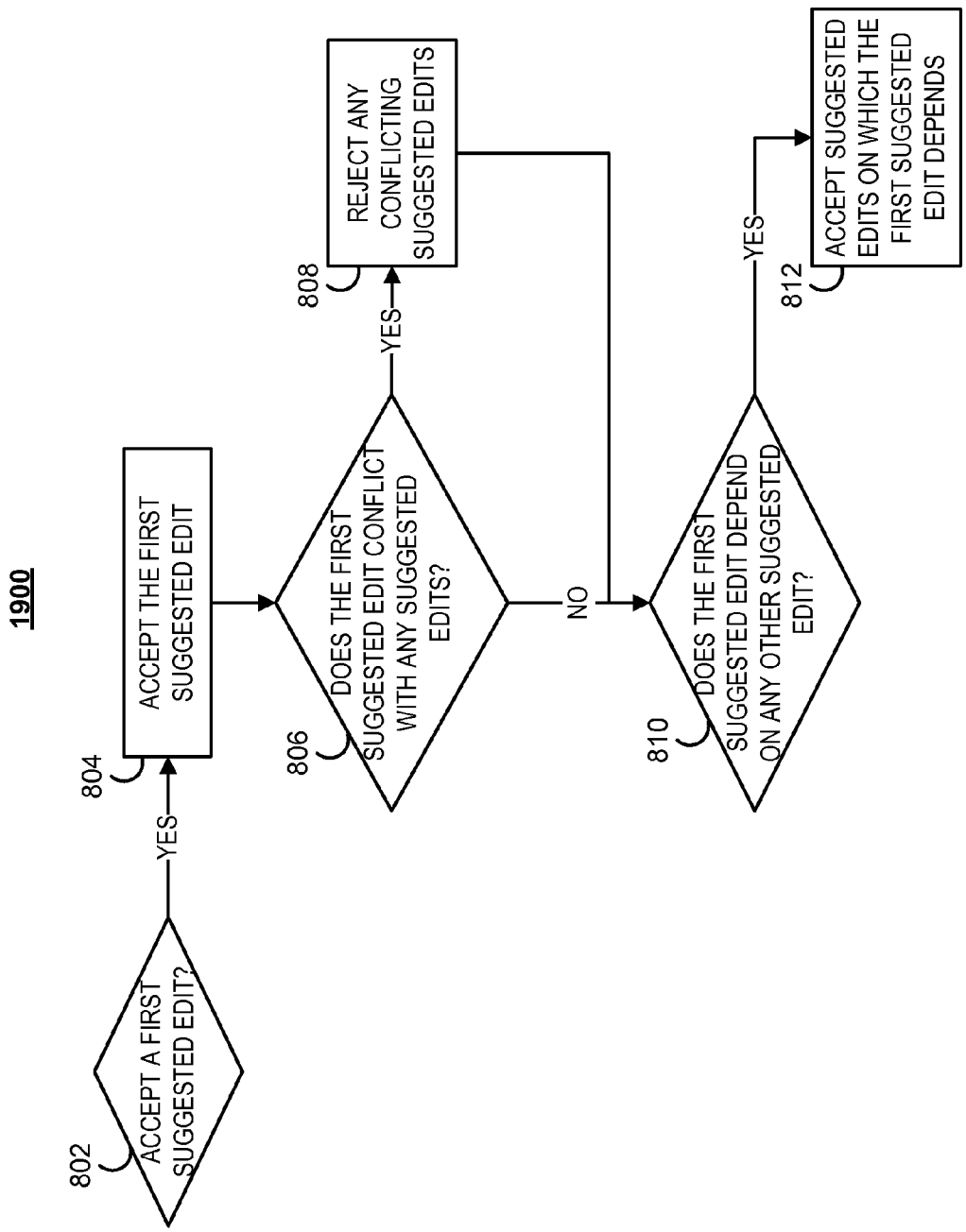
FIG. 19 is a flowchart of a method used by the review manager to determine whether to update a status of one or more suggested edits based on an update to another suggested edit, according to an illustrative embodiment.

FIG. 19 is an illustrative flow diagram of a method 1900 used by the review manager 102 to determine whether to accept or reject any suggested edits based on an acceptance or rejection of a first suggested edit. In an example, the method 1900 is representative of the steps performed by the review manager 102 to parse through tree diagrams such as tree diagrams 119 and 120 to identify conflicting or compounding relationships. The method 1900 includes the steps of determining to accept a first suggested edit (decision block 802) and accepting the first suggested edit (step 804). The method 1900 further includes determining whether the first suggested edit conflicts with any other suggested edits (decision block 806) and rejecting any identified suggested edits that conflict with the first suggested edit (step 808). The method 1900 also includes determining whether the first suggested edit depends on (or has a compounding relationship with) any other suggested edit (decision block 810) and accepting any identified suggested edits on which the first suggested edit depends (step 812).

At decision block 802, the review manager 102 determines to accept a first suggested edit. As described in relation to decision blocks 710 and 726 of the method 1800, the review manager 102 may make this determination based on a user input such as an input from an editor 108 indicating to accept the first suggested edit. In another example, the review manager 102 may make this determination based on previously received input from the editor 108 (i.e., by receiving an acceptance of another suggested edit, whose acceptance requires acceptance of the first suggested edit).

At step 804, the review manager 102 accepts the first suggested edit. In certain implementations, accepting the first suggested edit includes updating a view of the document 106 to reflect the acceptance. For example, when the first suggested edit was pending, the view of the document 106 may have included a markup of the document indicating the suggested edit (i.e., suggested additions may be underlined, suggested deletions may be crossed out, etc.). Upon acceptance of the first suggested edit, the markup may be removed from the display. Furthermore, a data structure storing data related to the first suggested edit may be updated to reflect the acceptance. In particular, the data structure may have a field entry for a status of the first suggested edit, and the status may be updated from pending to accepted.

At decision block 806, the review manager 102 determines whether the first suggested edit conflicts with any suggested edits. To do this, the review manager 102 may use a data structure such as the data structure 118 to determine, if any, the identifiers of any conflicting suggested edits. In another example, the review manager 102 may use a tree diagram such as tree diagrams 119 or 120 to identify any suggested edits that conflict with the first suggested edit. If any conflicting suggested edits are identified, the review manager 102 rejects the conflicting suggested edits at step 808. In certain implementations, rejecting the conflicting suggested edits includes updating a view of the document 106 to reflect the rejection. For example, upon rejection, the markup of the document indicating the conflicting suggested edits may be removed from the display. Furthermore, a data structure storing data related to the conflicting edits may be updated to reflect the rejection. In particular, the data structure may have a field entry for a status of the identified conflicting suggested edits, and the status of these edits may be updated from pending to rejected.

At decision block 810, the review manager 102 determines whether the first suggested edit depends on any other suggested edit. In particular, the review manager 102 identifies any compounding relationship such that acceptance of the first suggested edit requires acceptance of one or more other suggested edits. To do this, the review manager 102 may use a data structure such as the data structure 118 to determine, if any, the identifiers of any compounding suggested edits.

The review manager 102 may use a tree diagram such as tree diagrams 119 or 120 to identify any suggested edits whose acceptance is required for acceptance of the first suggested edit. In particular, these edits would be those compounding suggested edits positioned at higher levels than the first suggested edit. As an example, referring to the tree diagram 119, if the first suggested edit were the suggested edit 1278, the review manager 102 would identify the suggested edit 1254 as compounding with the first suggested edit. The compounding relationship between the suggested edits 1278 and 459 would not be considered here because the suggested edit 459 is at a lower levels than the suggested edit 1278, and acceptance of the suggested edit 1278 does not require a change in status to the suggested edit 459.

As another example, if the first suggested edit were the suggested edit 459, the review manager 102 would identify the suggested edit 1278 as compounding with the first suggested edit. Thus, acceptance of the suggested edit 459 requires acceptance of the suggested edit 1278. Furthermore, the review manager 102 may additionally determine that acceptance of the suggested edit 459 depends on acceptance of any suggested edit which is required by the suggested edit 1278 (i.e., the suggested edit 1254). Acceptance of the suggested edit 1254 may therefore also be required in order to accept the suggested edit 459. Thus, both suggested edits 1254 and 1278 may be identified at decision block 810. In general, any number of suggested edits at any number of levels of a tree diagram such as tree diagram 119 may be identified at decision block 810.

If any suggested edits are identified at decision block 810, the review manager 102 accepts the compounding suggested edits at step 812. In certain implementations, accepting the compounding suggested edits includes updating a view of the document 106 to reflect the acceptance. For example, upon acceptance, the markup of the document indicating the compounding suggested edits may be removed from the display. Furthermore, a data structure storing data related to the compounding edits may be updated to reflect the acceptance. In particular, the data structure may have a field entry for a status of the identified suggested edits, and the status of these edits may be updated from pending to accepted.

Figure 20:
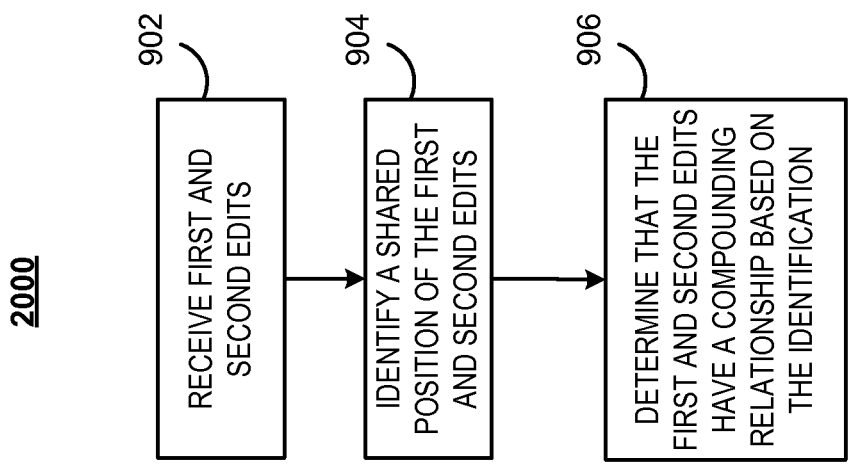
FIG. 20 is a flowchart of a method used by the review manager to identify a compounding relationship between two edits, according to an illustrative embodiment.
Figure 21:
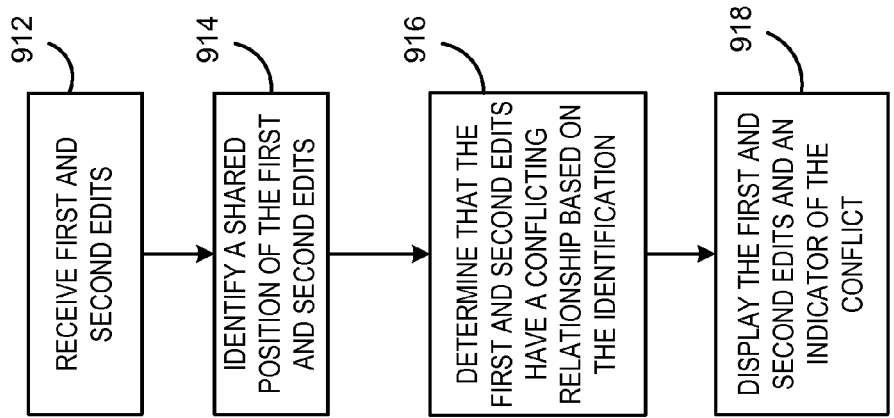
FIG. 21 is a flowchart of a method used by the review manager to identify a conflicting relationship between two edits, according to an illustrative embodiment.

FIGS. 20 and 21 are illustrative flow diagrams of methods 2000 and 2100 used by the review manager 102 to determine whether two suggested edits have a compounding relationship (i.e., method 2000) or a conflicting relationship (i.e., method 2100). The method 2000 includes the steps of receiving first and second edits (step 902), identifying a shared position of the first and second edits (904), and determining that the first and second edits have a compounding relationship based on the identification (step 906).

At step 902, the review manager 102 receives first and second edits. The first and second edits may correspond to any type of suggested change of a document, such as a suggested insertion, deletion, replacement, format change, or any other suitable type of suggested edit. The edits may be received from the same reviewer or different reviewers.

Figure 7:
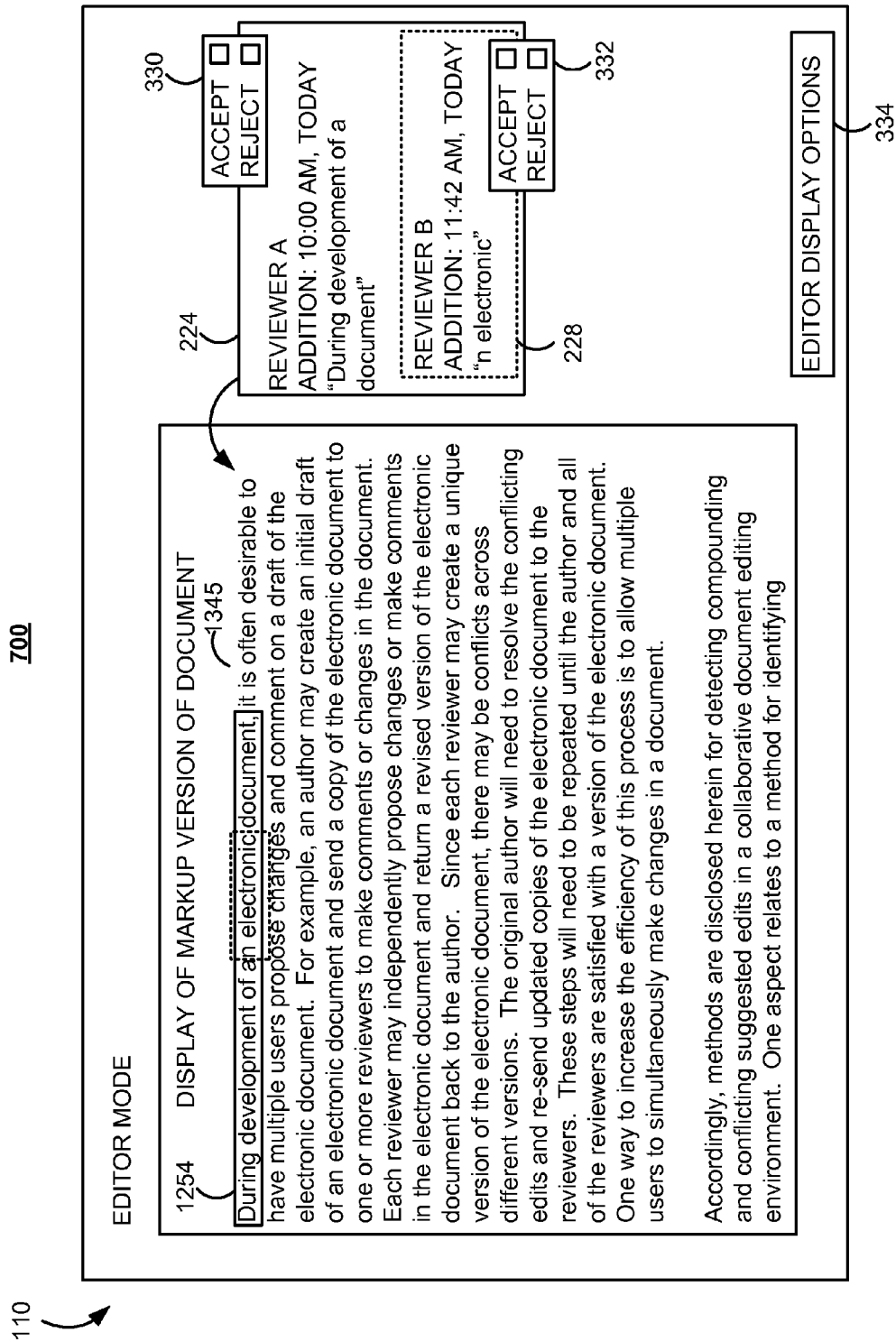
Figure 8:
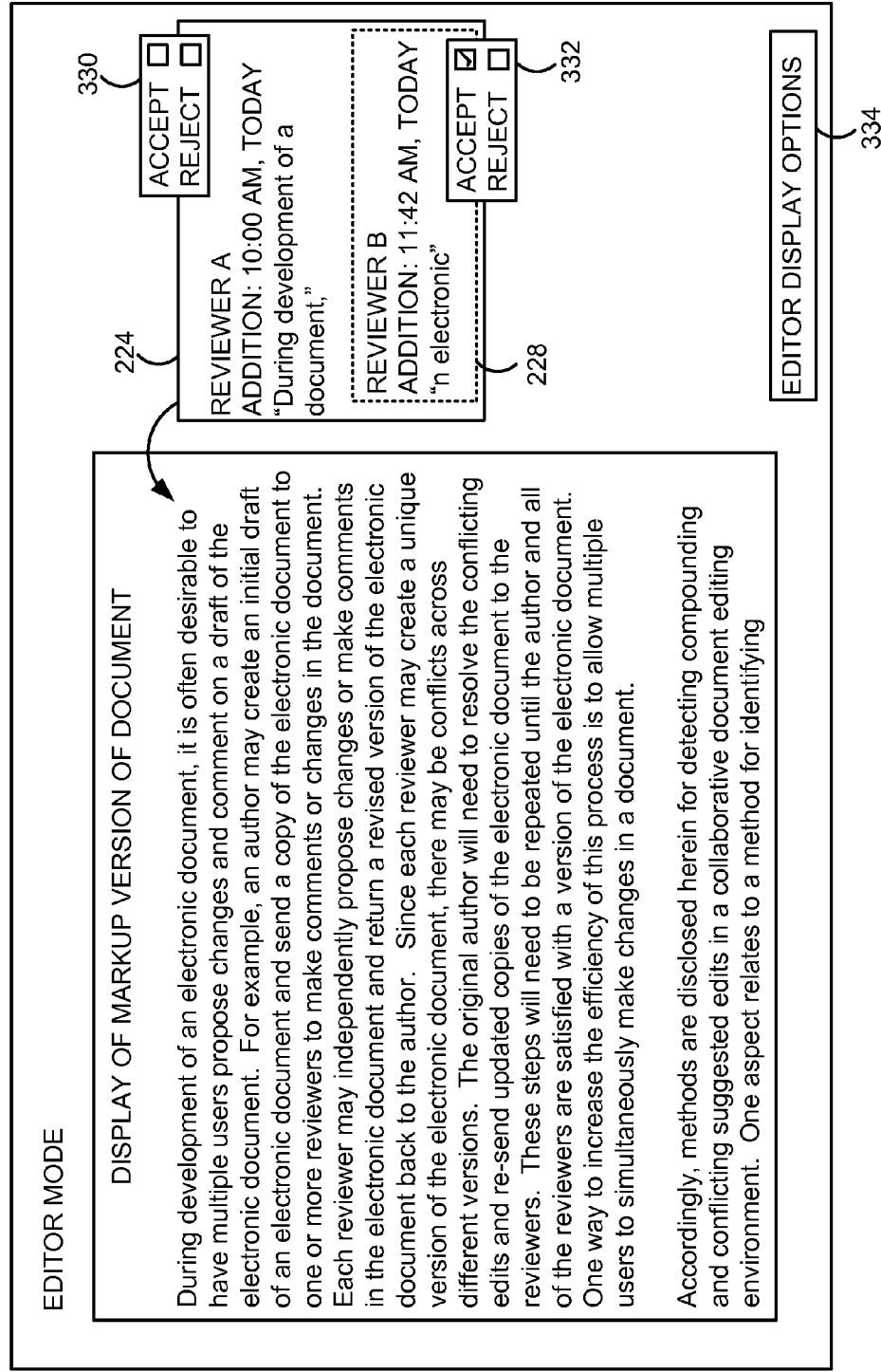
Figure 10:
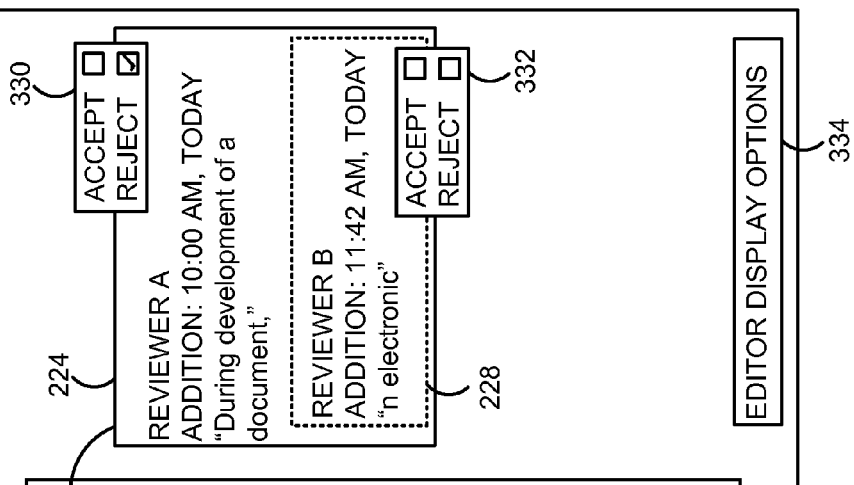

At step 904, the review manager 102 identifies a shared position of the first and second edits. The shared position includes a same portion of the document 106 to which both edits suggest making a change. For example, the first and second edits may correspond to the suggested edits 1254 and 1345, respectively, as shown in FIG. 7. In this case, the review manager 102 may identify the shared position to be the region of the document where the text of edit 1254 is suggested to be inserted (i.e., before "it is often desirable to . . . ").

At step 906, the review manager 102 determines that the first and second edits have a compounding relationship based on the identification. Because both edits include a suggested change of the document in the shared position, the shared position is indicative of a relationship between the edits. In particular, after identifying the shared position of the first edit (i.e., the suggested edit 1254) and the second edit (i.e., the suggested edit 1345), the review manager 102 determines that the first and second edits have a compounding relationship. The compounding relationship is determined based on the shared position. In addition, identifying the compounding relationship is based on a determination that acceptance of the second suggested edit requires acceptance of the first suggested edit.

The method 2100 includes the steps of receiving first and second edits (step 912), identifying a shared position of the first and second edits (step 914), determining that the first and second edits have a conflicting relationship based on the identification (step 916), and displaying the first and second edits and an indicator of the conflict (step 918).

At step 912, the review manager 102 receives first and second edits. The first and second edits may correspond to any type of suggested change of a document, such as a suggested insertion, deletion, replacement, format change, or any other suitable type of suggested edit. The edits may be received from the same reviewer or different reviewers.

At step 914, the review manager 102 identifies a shared position of the first and second edits. The shared position includes a same portion of the document 106 to which both edits suggest making a change. For example, the first and second edits may correspond to the suggested edits 574 and 687, respectively, as shown in FIGS. 11 and 13. In this case, the review manager 102 may identify the shared position to be the region of the document where the text of edit 574 is suggested to be deleted.

At step 916, the review manager 102 determines that the first and second edits have a conflicting relationship based on the identification. Because both edits include a suggested change of the document in the shared position, the shared position is indicative of a relationship between the edits. In particular, after identifying the shared position of the first edit (i.e., the suggested edit 574) and the second edit (i.e., the suggested edit 687), the review manager 102 determines that the first and second edits have a conflicting relationship. In addition, identifying the conflicting relationship is based on a determination that acceptance of one of the edits requires rejection of the other edit, and vice versa.

Figure 22:
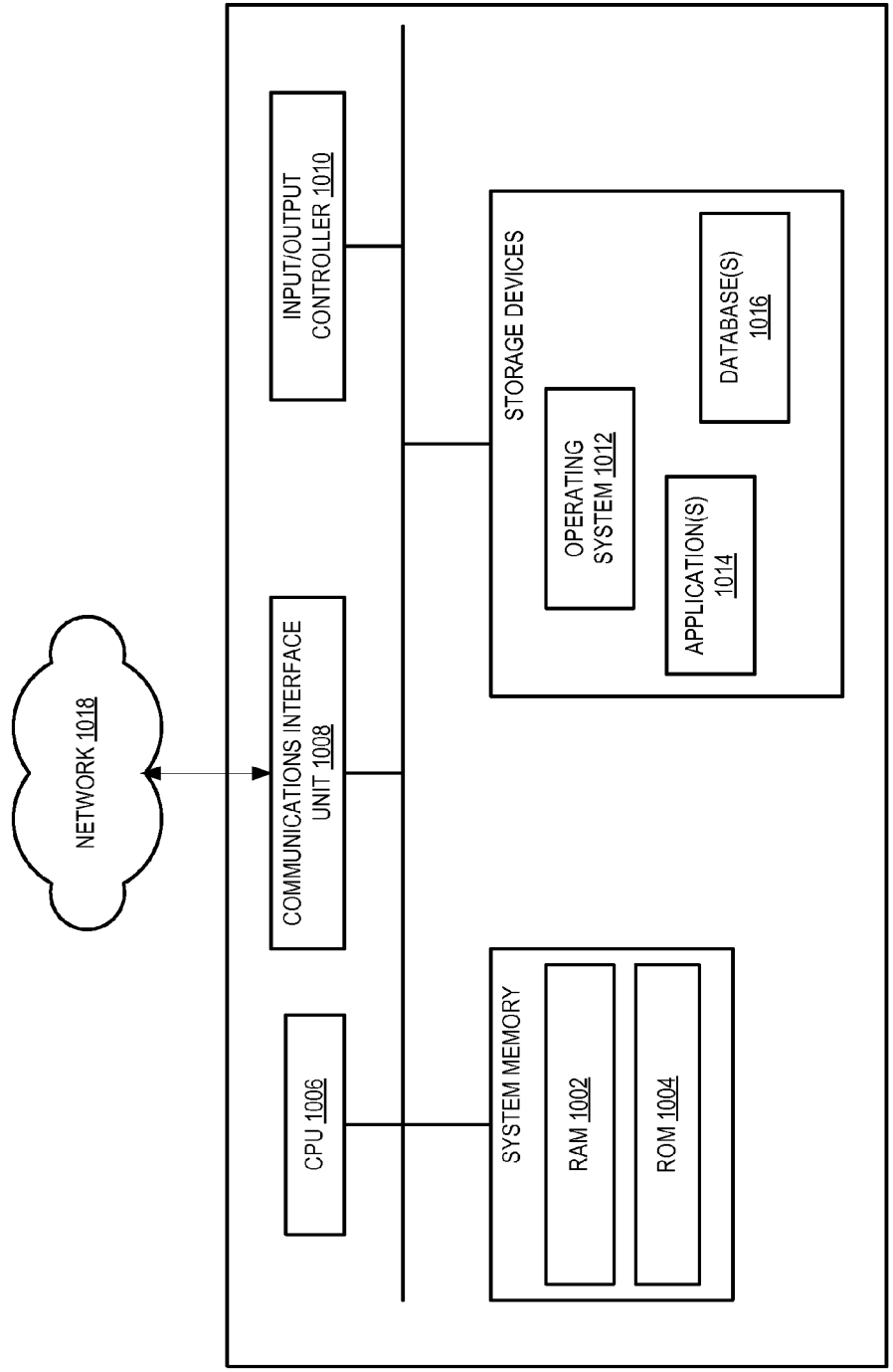
FIG. 22 is a block diagram of a computing device for performing any of the processes described herein, according to an illustrative embodiment.

FIG. 22 is a block diagram of a computing device, such as any of the components of the system of FIG. 1, for performing any of the processes described herein. Each of the components of these systems may be implemented on one or more computing devices 2200. In certain aspects, a plurality of the components of these systems may be included within one computing device 2200. In certain implementations, a component and a storage device may be implemented across several computing devices 2200.

The computing device 2200 comprises at least one communications interface unit, an input/output controller 1010, system memory, and one or more data storage devices. The system memory includes at least one random access memory (RAM 1002) and at least one read-only memory (ROM 1004). All of these elements are in communication with a central processing unit (CPU 1006) to facilitate the operation of the computing device 2200. The computing device 2200 may be configured in many different ways. For example, the computing device 2200 may be a conventional standalone computer or alternatively, the functions of computing device 2200 may be distributed across multiple computer systems and architectures. In FIG. 22, the computing device 2200 is linked, via network or local network, to other servers or systems.

The computing device 2200 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1008 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1006 comprises a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers or client terminals.

The CPU 1006 is also in communication with the data storage device. The data storage device may comprise an appropriate combination of magnetic, optical or semiconductor memory, and may include, for example, RAM 1002, ROM 1004, flash drive, an optical disc such as a compact disc or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 2200; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002. While execution of sequences of instructions in the program causes the CPU 1006 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to detecting relationships between edits and acting on a subset of edits as described herein. The program also may include program elements such as an operating system 1012, a database management system and "device drivers" that allow the processor to interface with computer peripheral devices (e.g., a video display, a keyboard, a computer mouse, etc.) via the input/output controller 1010.

The term "computer-readable medium" as used herein refers to any non-transitory medium that provides or participates in providing instructions to the processor of the computing device 2200 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 2200 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The invention claimed is:

1. A method to identify compounding relationships between edits in an electronic document, comprising:
   receiving, by a processor, a set of one or more first edits and a second edit to the electronic document;
   receiving, by the processor, an acceptance of the second edit from an editor of the electronic document;
   identifying, by the processor, a shared position of the set of one or more first edits and the second edit in the electronic document;
   filtering the set of one or more first edits to remove deletions in the electronic document and include insertions and modifications in the electronic document, to obtain at least a subset of the one or more first edits;
   determining, by the processor, that the subset of one or more first edits and the second edit have compounding relationships based at least in part on the identification, by determining that the subset of one or more first edits are required to be accepted in order for the second edit to be accepted; and
   in response to the determining that the subset of one or more first edits and the second edit have the compounding relationships, automatically accepting, by the processor, the subset of one or more first edits in response to receiving the acceptance of the second edit.

2. The method of claim 1, wherein the second edit comprises a modification of an element in at least one of the subset of the one or more first edits.

3. The method of claim 1, further comprising displaying, by the processor, the subset of one or more first edits and the second edit and an indicator of the compound relationships to a user of the electronic document.

4. The method of claim 3, wherein the indicator is dependent on a user type associated with the user, wherein:
   a reviewer is a user type with a first authorization level that allows the reviewer to provide suggested edits and comments to the electronic document,
   the editor is a user type with a second authorization level greater than the first authorization level,
   the second authorization level allows the editor to accept or reject the suggested edits provided by the reviewer and make direct edits to the electronic document, wherein the direct edits do not require acceptance before being implemented in the electronic document,
   a viewer is a user type with a third authorization level below the first authorization level, and
   the third authorization level allows the viewer to view the suggested edits provided by the reviewer but prohibits the viewer from providing suggested edits to the electronic document.

5. The method of claim 1, further comprising determining, by the processor, whether to display the subset of one or more first edits based on user input.

6. The method of claim 5, wherein the user input includes an indicator of a desired edit type or a desired user identifier.

7. The method of claim 6, wherein the processor displays the subset of one or more first edits when the subset of one or more first edits is associated with the desired edit type or the desired user identifier.

8. The method of claim 1, wherein the subset of one or more first edits and the second edit have compounding relationships when the second edit is dependent on the subset of one or more first edits, wherein the subset of one or more first edits comprises a first modification of an element to obtain a modified element, and the second edit comprises a second modification of the modified element.

9. A method to identify conflicting relationships between edits in an electronic document, comprising:
   receiving, by a processor, a set of one or more first edits, a second edit, and a third edit to the electronic document;
   receiving, by the processor, an acceptance of the third edit from an editor of the electronic document;
   identifying, by the processor, a shared position of the set of one or more first edits, the second edit and the third edit in the electronic document;

filtering the set of one or more first edits to remove deletions in the electronic document and include insertions and modifications in the electronic document, to obtain at least a subset of the one or more first edits;

determining, by the processor, that the subset of one or more first edits and the second edit have conflicting relationships and that the subset of one or more first edits and the third edit have compounding relationships based at least in part on the identification, by determining that the subset of one or more first edits are required to be accepted in order for the third edit to be accepted;

displaying, by the processor, the subset of one or more first edits, the second edit, the third edit, an indicator of the conflicting relationships and an indicator of the compounding relationships to a user of the electronic document; and in response to the determining that the subset of the one or more first edits and third edit have the compounding relationships, automatically accepting, by the processor, the subset of one or more first edits in response to receiving the acceptance of the third edit.

10. The method of claim 9, wherein each of the subset of one or more first edits and the second edit is one of a deletion, an insertion, a replacement, or a format change to the electronic document.

11. The method of claim 9, wherein the subset of one or more first edits and the second edit are suggested edits and the user is the editor of the electronic document; and further comprising rejecting the second edit in response to receiving an acceptance of the subset of one or more first edits from the editor.

12. A system to identify compounding relationships between suggested edits in an electronic document, comprising:
a processor;
a memory operatively connected to the processor, wherein the memory stores instructions that cause the processor to:
receive a set of one or more first edits and a second edit to the electronic document;
receive an acceptance of the second edit from an editor of the electronic document;
filter the set of one or more first edits to remove deletions in the electronic document and include insertions and modifications in the electronic document, to obtain at least a subset of the one or more first edits;
identify a shared position of the subset of one or more first edits and the second edit in the electronic document;
determine the subset of one or more first edits and second edit have compounding relationships based at least in part on the identification, by determining that the subset of one or more first edits are required to be accepted in order for the second edit to be accepted; and
in response to determining that the subset of one or more first edits and the second have compounding relationships, automatically accept the subset of one or more first edits in response to receiving the acceptance of the second edit.

13. The system of claim 12, wherein the second edit comprises a modification of an element in at least one of the subset of the one or more first edits.

14. The system of claim 12, wherein the subset of one or more first edits and the second edit have compounding relationships when the second edit is dependent on the subset of one or more first edits, wherein the subset of one or more first edits comprises a first modification of an element to obtain a modified element, and the second edit comprises a second modification of the modified element.

15. The system of claim 12, further comprising a user interface to display the subset of one or more first edits and second edit and an indicator of the compound relationships to a user of the electronic document.

16. The system of claim 15, wherein the indicator is dependent on a user type associated with the user, wherein:
a reviewer is a user type with a first authorization level that allows the reviewer to provide suggested edits and comments to the electronic document,
the editor is a user type with a second authorization level greater than the first authorization level,
the second authorization level allows the editor to accept or reject the suggested edits provided by the reviewer and make direct edits to the electronic document, wherein the direct edits do not require acceptance before being implemented in the electronic document,
a viewer is a user type with a third authorization level below the first authorization level, and
the third authorization level allows the viewer to view the suggested edits provided by the reviewer but prohibits the viewer from providing suggested edits to the electronic document.

17. The system of claim 12, further comprising a user interface to determine whether to display the subset of one or more first edits based on user input.

18. The system of claim 17, wherein the user input includes an indicator of a desired edit type or a desired user identifier.

19. The system of claim 18, wherein the subset of one or more first edits is displayed when the subset of one or more first edits is associated with the desired edit type or the desired user identifier.

20. A system to identify conflicting relationships between suggested edits in an electronic document, comprising:
a processor;
a memory operatively connected to the processor, wherein the memory stores instructions that cause the processor to:
receive a set of one or more first edits, a second edit, and a third edit to the electronic document;
receive an acceptance of the third edit from an editor of the electronic document;
identify a shared position of the set of one or more first edits, the second edit, and the third edit in the electronic document;
filter the set of one or more first edits to remove deletions in the electronic document and include insertions and modifications in the electronic document, to obtain at least a subset of the one or more first edits;
determine the subset of one or more first edits and the second edit have conflicting relationships and the subset of one or more first edits and the third edit have compounding relationships based at least in part on the identification, by determining that the subset of one or more first edits are required to be accepted in order for the third edit to be accepted; and
a user interface to display the subset of one or more first edits, the second edit, and the third edit, an indicator of the conflicting relationships and an indicator of the compounding relationships to a user of the electronic document, wherein the subset of one or more first edits are automatically accepted in response to receiving an acceptance of the third edit.

21. The system of claim 20, wherein each of the subset of one or more first edits and second edit is one of a deletion, an insertion, a replacement, or a format change to the electronic document.

22. The system of claim 20, further comprising a decider to reject the second edit when an acceptance of the subset of one or more first edits is received from the editor of the electronic document.

* * * * *